(12) United States Patent
Mo et al.

(10) Patent No.: US 9,139,972 B2
(45) Date of Patent: Sep. 22, 2015

(54) PERIODIC MATERIAL-BASED SEISMIC ISOLATION SYSTEM

(71) Applicants: Yi-Lung Mo, Pearland, TX (US); Yiqun Yan, Houston, TX (US)

(72) Inventors: Yi-Lung Mo, Pearland, TX (US); Yiqun Yan, Houston, TX (US)

(73) Assignee: UNIVERSITY OF HOUSTON, Houston, TX (US)

( * ) Notice: Subject to any disclaimer, the term of this patent is extended or adjusted under 35 U.S.C. 154(b) by 0 days.

(21) Appl. No.: 14/108,839

(22) Filed: Dec. 17, 2013

(65) Prior Publication Data

US 2014/0174001 A1   Jun. 26, 2014

Related U.S. Application Data

(60) Provisional application No. 61/738,093, filed on Dec. 17, 2012.

(51) Int. Cl.

| | |
|---|---|
| E04B 9/02 | (2006.01) |
| E02D 27/34 | (2006.01) |
| E04H 9/02 | (2006.01) |
| E02D 31/08 | (2006.01) |
| F16F 15/00 | (2006.01) |

(52) U.S. Cl.
CPC ................. *E02D 27/34* (2013.01); *E02D 31/08* (2013.01); *E04H 9/022* (2013.01); *F16F 15/00* (2013.01)

(58) Field of Classification Search
CPC ........... E04H 9/021; E04H 9/02; E04H 9/028; E02D 27/34; E02D 31/08; F16F 15/00
USPC ............... 52/167.4, 167.7, 167.8, 167.9, 292, 52/294, 299
See application file for complete search history.

(56) References Cited

U.S. PATENT DOCUMENTS

| | | | | |
|---|---|---|---|---|
| 3,349,418 | A | * | 10/1967 | Hein .............................. 14/73.5 |
| 4,121,393 | A | * | 10/1978 | Renault et al. ................ 52/167.7 |
| 4,258,516 | A | * | 3/1981 | Mori et al. .................... 52/126.6 |
| 4,499,694 | A | * | 2/1985 | Buckle et al. ................. 52/167.7 |
| 4,593,502 | A | * | 6/1986 | Buckle .......................... 52/167.7 |
| 4,630,412 | A | * | 12/1986 | Engstrom et al. .................... 52/1 |
| 4,644,714 | A | | 2/1987 | Zayas |
| 4,718,206 | A | * | 1/1988 | Fyfe et al. ..................... 52/167.8 |
| 4,830,927 | A | * | 5/1989 | Fukahori et al. .............. 428/495 |
| 4,950,528 | A | * | 8/1990 | Iizuka et al. .................. 428/212 |
| 4,978,581 | A | * | 12/1990 | Fukahori et al. .............. 428/492 |

(Continued)

OTHER PUBLICATIONS

Naeim, F. and Kelly, J.M. 1998, Design of Seismic Isolated Structures: From Theory to Practice (New York: Wiley).

(Continued)

*Primary Examiner* — Brian Glessner
*Assistant Examiner* — Adam Barlow
(74) *Attorney, Agent, or Firm* — Winstead PC

(57) ABSTRACT

Periodic material-based seismic isolation systems and methods are a new and innovative means to mitigate the potential damage to structures due to earthquakes or the like. The periodic materials are arranged in a periodic way in one, two and three directions, which are defined as one-dimensional (1D), two-dimensional (2D) and three dimensional (3D) periodic materials. With this periodic material, the pattern of the earthquake event energy can be completely obstructed or changed when it reaches the periodic foundation of the structural system. This may result in a total isolation of the foundation from the earthquake wave energy.

26 Claims, 29 Drawing Sheets

(56) References Cited

U.S. PATENT DOCUMENTS

| | | | |
|---|---|---|---|
| 5,014,474 A * | 5/1991 | Fyfe et al. | 52/167.8 |
| 5,657,597 A * | 8/1997 | Loftus | 52/274 |
| 6,289,640 B1 * | 9/2001 | Ueda et al. | 52/167.9 |
| 6,971,795 B2 | 12/2005 | Lee et al. | |
| 7,174,680 B2 * | 2/2007 | Smelser | 52/167.3 |
| 7,231,743 B2 * | 6/2007 | Takeuchi et al. | 52/167.3 |
| 7,292,740 B1 | 11/2007 | Barker et al. | |
| 7,305,799 B2 * | 12/2007 | Smelser et al. | 52/167.3 |
| 7,325,792 B2 | 2/2008 | Silno et al. | |
| 7,758,948 B2 * | 7/2010 | Suzuki et al. | 428/139 |
| 7,762,026 B2 * | 7/2010 | Smelser | 52/167.3 |
| 7,856,766 B2 * | 12/2010 | Takenoshita et al. | 52/167.8 |
| 8,156,696 B2 | 4/2012 | Hubbard et al. | |
| 8,215,068 B2 * | 7/2012 | Bongiorno | 52/167.8 |
| 8,281,911 B2 | 10/2012 | Helland | |
| 8,359,793 B2 * | 1/2013 | Zeevi | 52/167.8 |
| 8,590,258 B2 * | 11/2013 | Hinchman | 52/741.1 |

OTHER PUBLICATIONS

Sayani, P.J. and Ryan, K.L., 2009 Evaluation of Approaches to Characterize Seismic Isolation Systems for Design, J. Earthq. Eng. 13, 835-851.

Zhou, F. L., Tan, P., Xian, Wi., Huang, X.Y. and Yang, Z., 2006 Research and Application of Seismic isolation System for Building Structures, J. Archit. Civil Eng. 23 1-8.

Kittel, C., 2005 Introduction to Solid State Physics 8th edn, 7 Energy Bands (New York: Wiley), pp. 167-1687.

Liu, Z. Y., Zhang, W., Mao, Y., Zhu,Y. Y., Chan, C.T. and Sheng, P., 2000 Locally Resonant Sonic Materials Science 289, 1734-1736.

Xiao, W., Zeng, G. W. and Cheng,Y.S., 2008 Flexural Vibration Band Gaps in a Thin Plate Containing a Periodic Array of Hemmed Discs Appl. Acounst. 69, 255-261.

Thomas, E. L., Gorishnyy T., and Maldovan, M., 2006 Phononics: Colloidal Crystals Go Hypersonic Nat. Mater, 5, 773-774.

Torres, M. and Montero de Espinosa, F. R. 2004, Ultrasonic Band Gaps and Negative Refraction Ultrasonics 42, 787-790.

Bao, J., Shi, Z. F. and Xiang, H. J., 2012 Dynamic Responses of a Structure with Periodic Foundations, J. Eng. Mech. 138, 761-769.

Huang, J. K. and Shi, Z. F., 2012 The Application of Periodic Theory to Rows of Piles for Horizontal Vibration Attenuation Int. J. Geomech. (in press) http://dx.dol.org/10.1061/(ASCE)GM.1943-5622.0000193.

Jia, G. F. and Shi., Z. F., 2010 A New Seismic Isolation System and its Feasibility Study Earthq. Eng. eng. Vib. 9, 75-82.

Xiang, H. J. and Shi,Z. F., 2009 Analysis of Flexural Vibration Band Gaps in Periodic Beams Using Differential Quadrature Method Compt., Struct. 87, 1559-1566.

Xiang, H. J., Shi., Z.F. and Bao, J., 2010 Seismic Isolation of Buildings with a New Type of Periodic Foundations: ASCE Earth and Space 12th Conference (Honolulu, Hawaii).

Sigalas, M., Kushwaha, M.S., Economou, E.N., Kafesaki, M., Psarobas, I.E. and Steurer, W., 2005 Classical Vibrational Modes in Phononic Latticers: Theory and Experiment Z. Kristall, 200, 765-809.

Steurer, W. and Sutter-Widmer, D., 2007 Photonic and Phononic Quasicrystals J. Phys. D-Appl. Phys. 40 R229-R247.

PEER 2011 Peer Ground Motion Database http://peer.berkeley.edu/peer_ground_motion_database.

Xiang, H. J., Shi, Z. F., Wang, S. J., and Mo,Y. L., Smart Materials and Structures 21 (2012) 112003 (10pp), Fast Track Communications Periodic materials-based vibration attenuation in layered foundations: experimental validation.

Yan, Y.Q., Cheng, Z.B., Menq, Farn-Yuh, Mo, Y.L., Shi, Z.F. and Stokoe, II, Kenneth H., Transactions, S MiRT-22, San Francisco, California, USA—Aug. 18-23, 2013, Division V, 22nd Conference on Structural Mechanics in Reactor Rechnology, "Seismic Isolation with Two-Dimensional Periodic Foundations".

Xiang, H. J., Shi, Z.F., Wnag, S. J. and Mo, Y.L., 15 WCEE Lisboa 2012, Vibraion Attenuation and Frequency Band Gaps in Layered Periodic Foundation: Theory and Experiment.

* cited by examiner

WAVE DIRECTION

UNIT CELL

BEAM CROSS-SECTION

COLUMN CROSS-SECTION

SLAB

LAYOUT OF THE PERIODIC FOUNDATION

CASE-I
SIMPLIFIED MODEL

CASE-II
SIMPLIFIED MODEL

PERIODIC MATERIAL-BASED SEISMIC ISOLATION SYSTEM

RELATED APPLICATIONS

This application claims the benefit of U.S. Provisional Patent Application No. 61/738,093 to Mo et al., filed on Dec. 17, 2012, which is incorporated herein by reference.

FIELD OF THE INVENTION

This invention relates to seismic isolation systems and methods. More particularly, to periodic material based seismic isolation.

BACKGROUND OF INVENTION

The design of buildings and other structures capable of withstanding earthquake events has been the research focus by engineers for many decades. A commonly accepted method for the design of seismic-resistant buildings and structures, however, has not been developed up to the present time. Fortunately, the traditional design methods, simply based on the static structural strength with impact factors to account for dynamic loads, have been reviewed and gradually replaced by novel methodologies over the last three decades. Concepts of structural element ductility and the importance of shear resistance have contributed to the ability to effectively design structural elements and systems that are resistant to dynamic loadings associated with earthquakes.

The use of passive and active systems has been proposed and implemented in an attempt to enhance the ability of the structure to resist and survive an earthquake event. Recent design methods have also been proposed in which seismic isolation technologies are utilized as a method to resist seismic loadings. One strategy implemented to date has been the addition of a base isolation system (usually a layer with low horizontal stiffness or sliding elements) between the base of the structure and ground. This system attempts to modify the fundamental frequency of the structure, thereby decreasing its acceleration response. The strategy of adding an isolation system between the base of the structure and ground will typically result in the structure with a much lower fundamental frequency than the original fundamental frequency of the non-isolated (fixed-base) structure. According to the acceleration design spectrum, a change in the fundamental frequency of a structure may reduce the acceleration response significantly, thereby enhancing the overall ability of the structure to withstand and survive the earthquake event. One significant drawback of a traditional seismic isolation system, however, is that the isolation system will usually have residual (permanent) horizontal displacements after earthquake events.

Better re-centering capability, supplementary dampers are desirable. Seismic isolation systems and methods discussed herein may utilize periodic materials, including 1D, 2D and/or 3D periodic materials.

SUMMARY OF THE INVENTION

Periodic material-based seismic isolation systems and methods are a new and innovative means to mitigate the potential damage to structures. The periodic materials are arranged in a periodic way in one, two and three directions, which are defined as one-dimensional (1D), two-dimensional (2D) and three dimensional (3D) periodic materials. With periodic material, the pattern of the earthquake event energy can be completely obstructed or changed when it reaches the periodic foundation of the structural system. This may result in a total isolation of the foundation from the earthquake wave energy. In some embodiments, the periodic materials may isolate or mitigate frequencies equal to or less than 20 Hz.

In one embodiment, the periodic material may be 1D. In some embodiments, 1D periodic material may provide alternating layers of strong and elastic materials, such as reinforced concrete and rubber. In another embodiment, the periodic material may be 2D. In some embodiments, the 2D periodic material may provide a coated core positioned in a layer of strong materials. As a nonlimiting example, 2D periodic material may be a reinforced concrete layer with coated core. In some embodiments, the core may be a cylinder with circular, rectangular, ellipse, parabola, or hyperbola cross section. In other embodiments, the core may be a cuboid or cubic. The cylinder core may be formed of a hard material, and the coating on the cylinder may be an elastic material. In some embodiments, the coated core may be steel cylinders coated with rubber. In yet another embodiment, the periodic material may be 3D. In some embodiments, the 3D periodic material may provide a reinforced concrete layer with a coated core. The core may be a sphere, cuboid, or cube. The core may be formed from a hard material, and the coating may be an elastic material. In some embodiments, the coated core may be a steel sphere, cuboid, or cube coated with rubber.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1A:
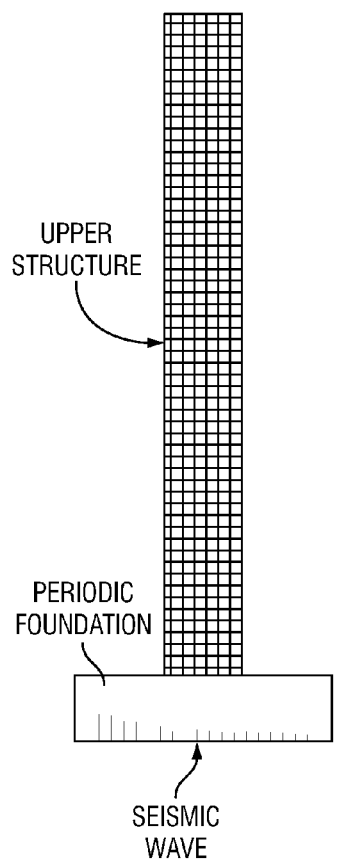
FIGS. 1A-1D is a schematic diagram of periodic foundations: (a) Periodic foundation with upper structure; (b) 1D periodic foundation; (c) 2D periodic foundation; and (d) 3D periodic foundation.
Figure 1B:
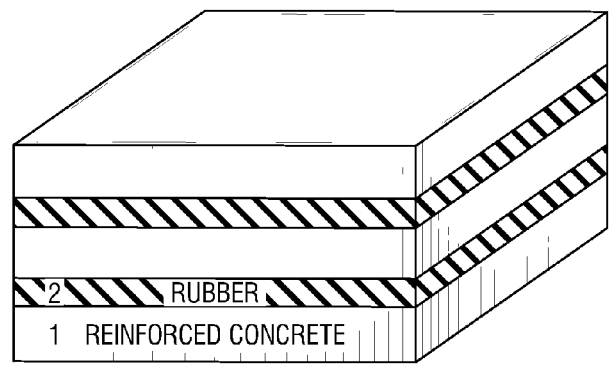
Figure 1C:
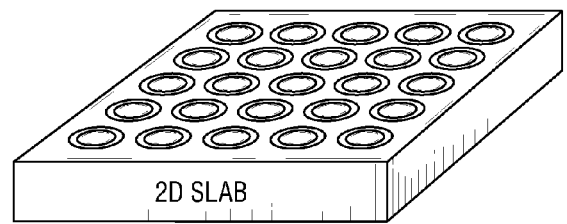

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Investigations in the field of solid-state physics have shown that certain crystal arrangements may be utilized to manipulate the energy or patterns of acoustic (mechanical) wave energy. These materials, termed phononic crystals, can be designed to produce specific gaps in the frequency response of the structure. These gaps in the frequency response are termed "frequency band gaps." For the purpose of clarity, it should be recognized that the term "periodic material" refers to materials that produce gaps in the frequency response of a structure, such as phononic crystals. When the frequency contents of a wave fall within the range of the frequency band gap of a periodic material structure, the wave, and hence its energy, cannot propagate through the periodic structure.

Periodic material-based seismic isolation systems and methods discussed herein are a new and innovative means to mitigate the potential damage to structures. The periodic materials are arranged in a periodic way in one, two and three directions, which are defined as one-dimensional (1D), two-dimensional (2D) and three dimensional (3D) periodic materials. With this periodic material, the pattern of the earthquake event energy or the like can be completely obstructed or changed when it reaches the periodic foundation of the structural system. This may result in a total isolation of the foundation from the wave energy because no energy will be passing through it. This seismic isolation system can filter out the strong frequency motion that the upper structure may be otherwise subjected to. In some embodiments, one can adjust the frequency band gap of periodic material to match the fundamental frequency of the super structure so that the motion transmitted from the foundation does not contain this frequency. This total isolation will be of special significance to some specific structures housing highly vibration-sensitive equipment such as research laboratories, medical facilities with sensitive imaging equipment, or high-precision facilities specializing in the fabrication of electronic components. Further, the full isolation of emergency-critical structures such as bridges, hospitals housing emergency response units or equipment, and power generation or distribution structures will have a better earthquake emergency response; consequently, there will be fewer compromises to the entire emergency response system. The isolation systems are low-cost, and utilize widely used raw materials, such as steel, rubber, concrete, and/or other materials with similar material properties.

Periodic material may be utilized for seismic base isolation to mitigate the potential damage to structures. With this periodic material, the pattern of the earthquake event energy will be completely obstructed or changed when it reaches the periodic foundation of the structural system. This will result in a total isolation of the foundation from the earthquake wave energy because no energy will be passing through it. This total isolation will be of special significance to some specific structures housing highly vibration-sensitive equipment such as research laboratories, medical facilities with sensitive imaging equipment, high-precision facilities specializing in the fabrication of electronic components, or the like. Further, the full isolation of emergency-critical structures such as bridges, hospitals housing emergency response units or equipment, power generation or distribution structures, or the like will have a better earthquake emergency response. Consequently, there will be fewer compromises to the entire emergency response system.

Figure 1D:
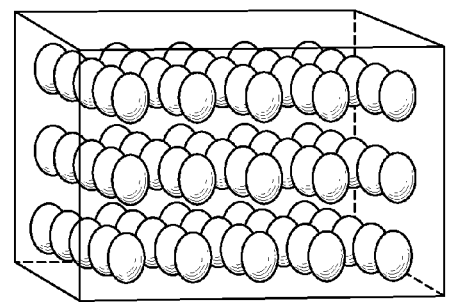
Figure 2:
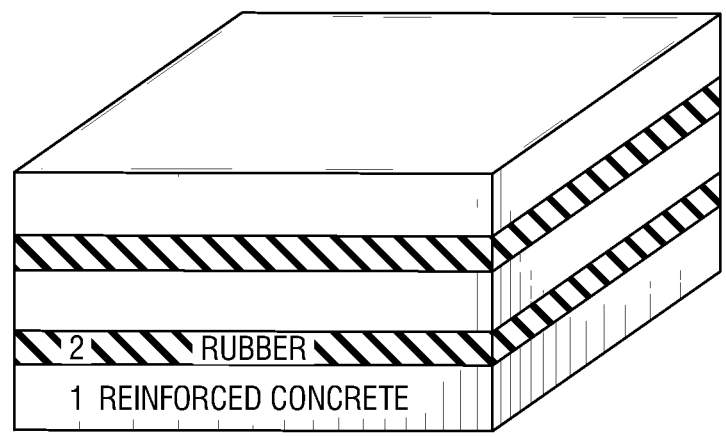
FIG. 2 is an illustrative embodiment of a 1D layered foundation.

There are three types of periodic materials: one-dimensional (1D), two-dimensional (2D) and three-dimensional (3D) periodic materials. FIGS. 1A-1D are illustrative embodiments of a periodic foundation with an upper structure, such as a 1D periodic foundation (FIG. 1B), 2D periodic foundation (FIG. 1C), and 3D periodic foundation (FIG. 1D). In some embodiments, the periodic materials may isolate or mitigate frequencies equal to or less than 20 Hz. In some embodiments, all of the band gaps of the periodic material may be equal to or less than 20 Hz. A 1D periodic foundation may provide alternating layers of materials. In some embodiments, the periodic foundation may alternate between layers of strong and soft (or elastic) materials. As a nonlimiting illustrative example, a strong material may be any materials with material properties similar to reinforced concrete and a soft material may be any material with a Young's modulus close to or less than that of rubber. The periodic materials may be referred to as 1D because it obstructs energy propagation in one direction, e.g. along the x, y, or z axis. FIG. 2 is an illustrative nonlimiting embodiment of a 1D periodic foundation providing alternating layers of rubber and reinforced concrete.

Figure 3A:
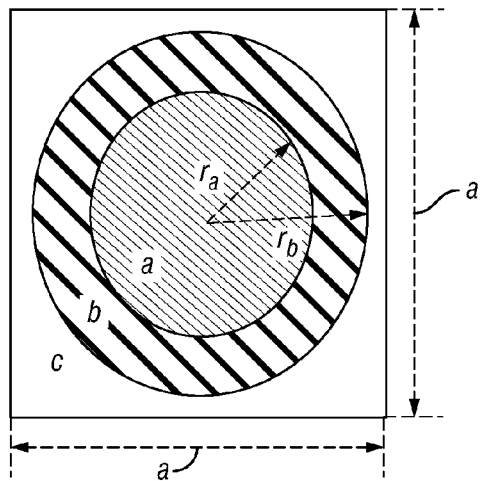
FIGS. 3A-3C are illustrative embodiments of a 2D periodic foundation.
Figure 3B:
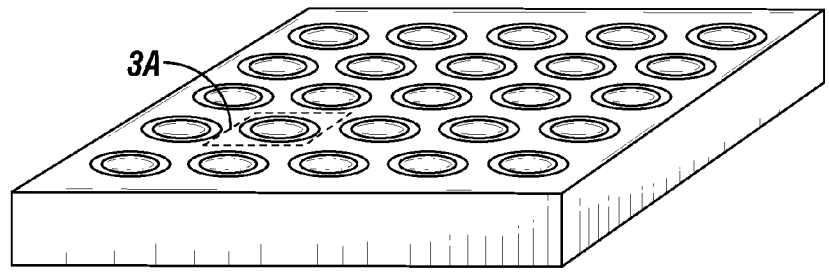
Figure 3C:
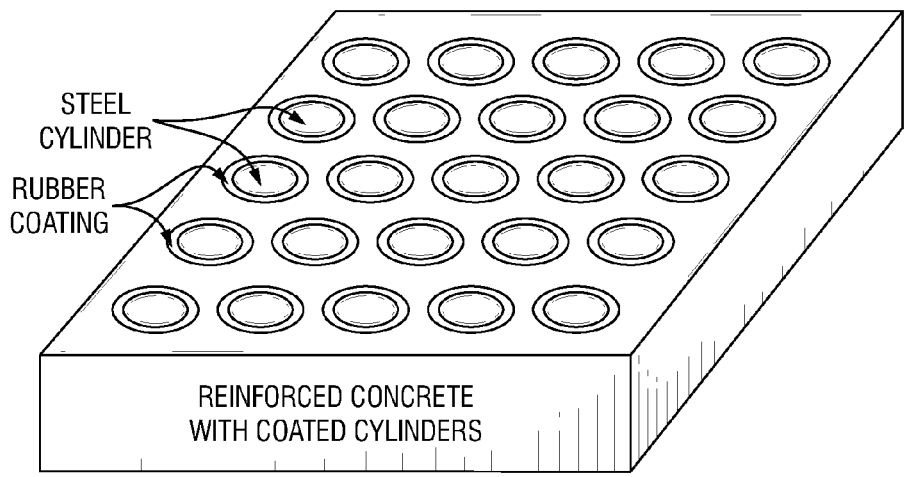

FIGS. 3A-3C is an illustrative nonlimiting embodiment of a 2D periodic foundation, with a close up view and a cross section. The periodic materials may be referred to as 2D because it obstructs energy propagation in two directions, e.g. in the x and y, x and z, or y and z axis. A 2D periodic foundation may provide one or more periodic layers with an array of additional material(s) positioned in the layer(s). The periodic layer may be reinforced concrete or any material with similar material properties as reinforced concrete, and may surround the additional material(s). The additional material(s) provide a core material with a coating layer. The core material may be formed into a variety of three-dimensional shapes, such as, but not limited to, cuboid, cylinder, right circular cylinder, elliptic cylinder, parabolic cylinder, or hyperbolic cylinder. In some embodiments, the core material may be formed of a strong material. Additionally, the core material may have a high density, such a density of 7000 kg/m³ or greater. In some embodiments, the core material may be steel or material that has a Young's modulus close to or greater than that of steel. The coating layer surrounding the core material may be formed from an elastic or soft material, such as rubber or material that has a Young's modulus close to or less than that of rubber. In the embodiment of a unit cell shown in FIG. 3A, the core materials are right circular cylinders of steel with a radius $r_a$. The cylinders are coated with rubber, thereby providing a total radius $r_b$. As shown in FIGS. 3B-3C, the unit cells are arranged in an array within a layer or matrix of reinforced concrete surrounding the steel cylinder and rubber coating. In some embodiments, a side length of the unit cell or periodic cell is ≥1 m. In some embodiments, a thickness of the coating is ≥0.04 m. In some embodiments, a length of core is ≥0.4 m and ≤0.7 m. In some embodiments, a ratio of core mass density is ≥0.5 and ≤2.0.

Figure 4A:
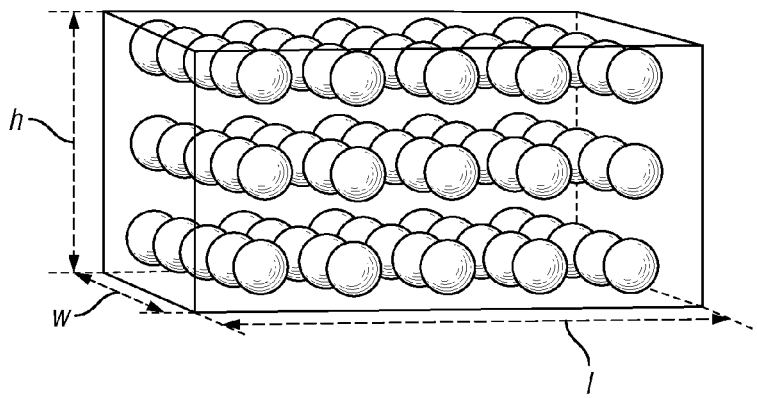
FIGS. 4A-4C are illustrative embodiments of a 3D periodic foundation (a) Schematic, (b) Unit Cell, and (c) Slice of Unit Cell.
Figure 4B:
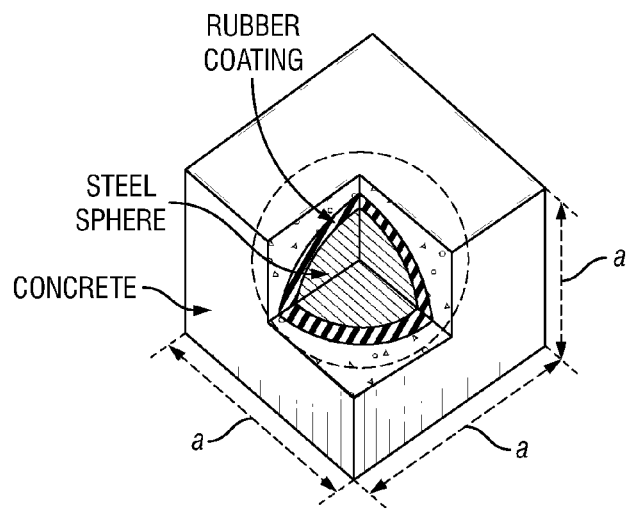
Figure 4C:
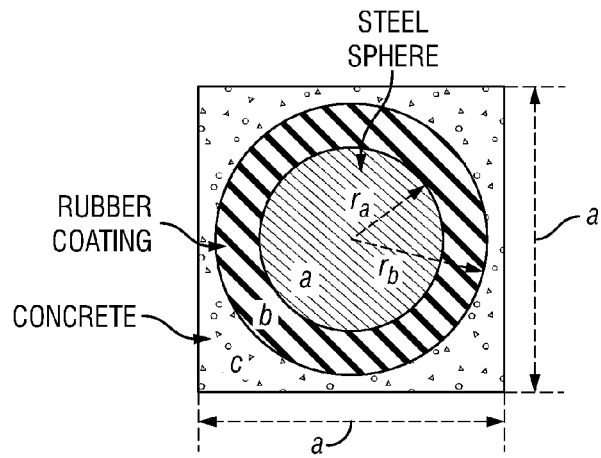

FIGS. 4A-4C is an illustrative nonlimiting embodiment of a 3D periodic foundation providing a periodic layer with an array of unit cells, including a close up isometric view and a cross-section of a unit cell. The periodic materials may be referred to as 3D because it obstructs energy propagation in three directions, e.g. x, y, and z axis. Each unit cell provides a matrix material, core material, and a coating layer. The matrix material may be reinforced concrete or any material with similar material properties as reinforced concrete, and may surround the core material and coating layer. In some embodiments, the core material may be formed into a variety of three-dimensional shapes, such as, but not limited to, spheres, cuboids, or cubes. In some embodiments, the core material may be formed of a strong material. Additionally, the core material may have a high density, such a density of 7000 kg/m³ or greater. In some embodiments, the core material may be steel or material that has a Young's modulus close to or greater than that of steel. The coating layer surrounding the core material may be formed from an elastic or soft material, such as rubber or material that has a Young's modulus close to or less than that of rubber. In the embodiment of a unit cell shown, the core materials are steel spheres with a radius $r_a$. The core is coated with rubber, thereby providing a total radius $r_b$. The matrix material surrounds steel core and rubber coating. As shown in FIG. 4A, the periodic layer provide an array of coated cores within the matrix material. In some embodiments, a side length of the unit cell or periodic cell is ≥1 m. In some embodiments, a thickness of the coating is ≥0.04 m. In some embodiments, a length of core is ≥0.4 m and ≤0.7 m. In some embodiments, a ratio of core mass density is ≥0.5 and ≤2.0.

The periodic material based seismic isolation system has several novel aspects. Other seismic isolation systems generally employ high damping rubber bearings, lead-rubber bearings, or friction pendulum bearings (FPS bearings). In all these designs, large relative displacements between the building and the foundation occur which accompany the reduction in seismic input (acceleration) to the superstructure. A gap (sometimes called a "moat") is usually provided between the isolated structure and the surrounding non-isolated structures to avoid hammering of these structures. A periodic material-based foundation and design that has minimal or no relative displacement during the earthquakes will be a very desirable feature.

The manufacturing process of the system is relatively simple and the raw materials needed are widely used in construction. In some embodiments, a 1D layered foundation comprises concrete and rubber. In some embodiments, the 2D and 3D periodic foundations comprises core steel, a rubber layer, and concrete. The frequency band gaps of periodic material-based foundation that are isolated can be optimized for a particular structure. Also, a seismic isolation system can be designed according to the specified upper structure. Therefore, the isolation method is both simple and economical.

Periodic material-based isolation system will have a wide range of uses and will be of special significance to some specific structures housing highly vibration-sensitive equipment, such as research laboratories, medical facilities with sensitive imaging equipment, or high-precision facilities specializing in the fabrication of electronic components. Further, the full isolation of emergency-critical structures such as bridges, hospitals housing emergency response units or equipment, and power generation or distribution structures will have a better earthquake emergency response; consequently, there will be fewer compromises to the entire emergency response system.

Theory Relating to 1D Periodic Materials

Figure 5A:
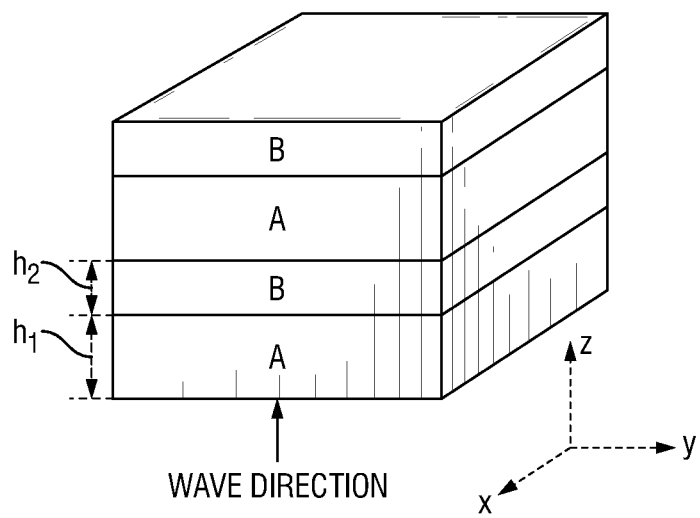
FIGS. 5A-5B are illustrative embodiments of a configuration of a layered periodic foundation and its unit cell.
Figure 5B:
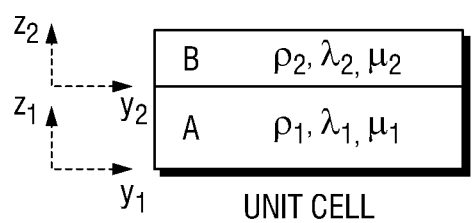

Consider a periodic composite foundation of alternating layers of two isotropic materials arranged as shown in FIG. 5a. For the coordinate system specified, any two adjacent layers in the body comprise a unit cell, and this unit cell is completely invariant under a lattice translation along the z-direction. Each layer is infinitely extended in the plane. The thickness of Layer A and Layer B of a unit cell is $h_1$ and $h_2$, respectively. The periodicity of the foundation structure and displacement makes it possible to investigate the frequency band gap by studying one periodic unit, or unit cell as show in FIG. 5b. v, w are displacements in y and z direction, respectively. Consider an elastic wave with propagation along z. The equation of motion in each layer is $$\frac{\partial^2 u_i}{\partial t^2} = C_i^2 \frac{\partial^2 u_i}{\partial z_i^2} \qquad 1.1$$

where u=w and $C=C_p=\sqrt{(\lambda+2\mu)/\rho}$ for longitudinal wave (P wave), or u=v and $C=C_t=\sqrt{\mu/\rho}$ for transverse wave (S wave). The coefficients $\lambda$ and $\mu$ are Lamé's elastic constant, $\rho$ is density. The index i=1, 2 indicates layers A and B, respectively. For the free vibration analysis, a plane wave form solution to Eq. (1.1) is assumed to be $$u_i(z_{i,t}) = e^{j(kz_{i-t})} u_i(z_i) \qquad 1.2$$

where k is the wave number, $\omega$ the angular frequency and j the imaginary unit. Substituting Eq. (1.2) into Eq. (1.1) yields $$C_i^2 \frac{\partial^2 u_i(z_i)}{\partial z_i^2} + \omega^2 u_i(z_i) = 0 \qquad 1.3$$

The general solution of this equation is found as follows:

$$u_i(z_i) = A_i \sin(\omega z_i/C_i) + B_i \cos(\omega z_i/C_i) \qquad 1.4$$

There are four unknown constants $A_1$, $A_2$, $B_1$ and $B_2$ which are determined by boundary and continuity conditions. For the case of transverse waves, the normal stress $\sigma_z$ in each layer is zero which automatically satisfies the continuous condition at the interface. The stress continuity across the interface requires that the shear stress $\tau$ is continuous. Therefore, the continuity of displacement and stress at the interface $z_2=0$ (or $z_i=h_i$) are $$u_1(h_1) = u_2(0), \tau_1(h_1) = \tau_2(0) \qquad 1.5$$

Due to the periodicity of the layered structure in the z direction, according to the Block-Floquet theorem, the displacement and stress must satisfy the following periodic boundary conditions $$u_1(0)e^{jk \cdot h} = u_2(h_2), \tau_1(0)e^{jk \cdot h} = \tau_2(h_2) \qquad 1.6$$

where $h=h_1+h_2$. The shear stress can be expressed as $$\tau_i(z_i) = \mu_i \partial u_i/\partial z_i = \mu_i \omega [A_i \cos(\omega z_i/C_{ii}) - B_i \sin(\omega z_i/C_{ii})]/C_{ii} \qquad 1.7$$

Substituting Eqs. (1.4) and (1.7) into Eqs. (1.5) and (1.6), we have

A necessary and sufficient condition for the existence of a non-trivial solution to Eq. (1.8) is that the determinant of the coefficient matrix is zero. After the expanding the determinant, one obtains the dispersion relation for $\omega$ as a function of k, which is given by $$\cos(k \cdot h) = \cos\left(\frac{\omega h_1}{C_{t1}}\right)\cos\left(\frac{\omega h_2}{C_{t2}}\right) - \frac{1}{2}\left(\frac{\rho_1 C_{t1}}{\rho_2 C_{t2}} + \frac{\rho_2 C_{t2}}{\rho_1 C_{t1}}\right)\sin\left(\frac{\omega h_1}{C_{t1}}\right)\sin\left(\frac{\omega h_2}{C_{t2}}\right) \qquad 1.9$$

Figure 6A:
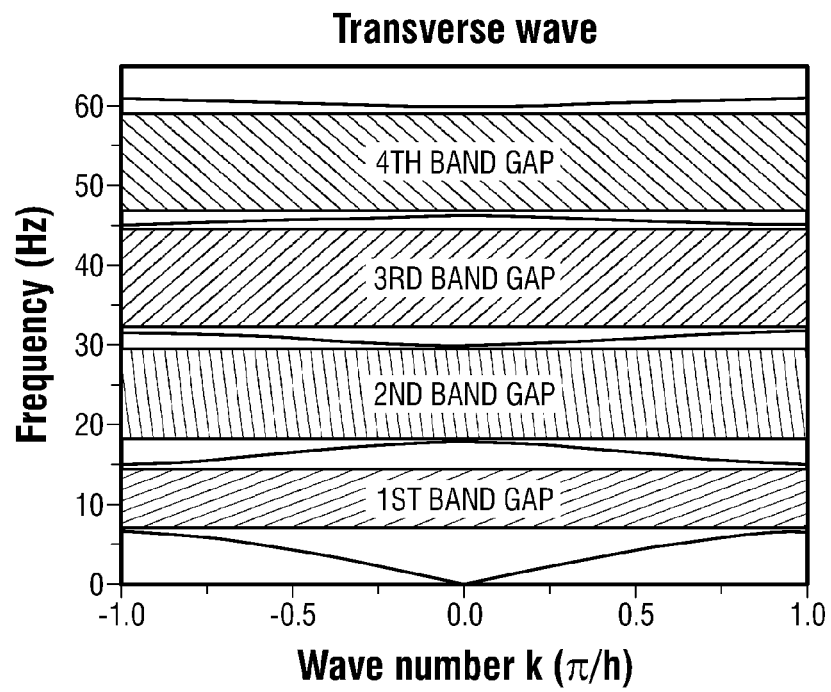
FIGS. 6A-6B show dispersion curves for 1D periodic foundation.
Figure 6B:
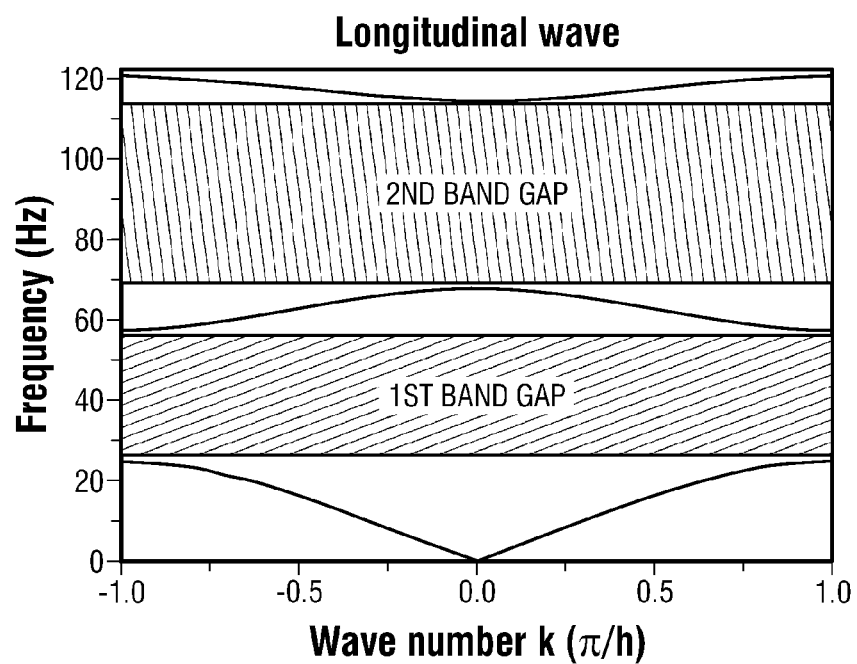

Because $|\cos(k \cdot h)| \leq 1$, Eq. (1.9) is satisfied only when the value of the right-hand side is between $-1$ and $+1$. The band gaps are the values of $\omega$ and k that are the solutions to Eq. (1.9) but cos(k h) falls outside the range of $-1$ to 1. Following the same procedure, one can derive a similar result for the case of longitudinal waves. If materials A and B are the same, i.e. $C_{t1}=C_{t2}=C_t$ and $\rho_1=\rho_2$, we get the dispersion relation for a homogenous material as $\cos(k \cdot h) = \cos(\omega h/C_t)$ where $\omega=kC_t$. For any value of k, we can find a frequency $\omega$ to satisfy this relation. This is the reason why there are no band gaps in a homogenous material. In general, the dispersion equation that defines the relation between $\omega$ and k is numerically solved to find values of $\omega$ and k. Though the wave vector k is unrestricted, it is only necessary to consider k limited to the first Brillouin zone, i.e., $k \in [-\pi/h, \pi/h]$. In fact, if we choose a wave vector $k_0$ different from the original k in the first Brillouin zone by a reciprocal lattice vector, for example $k_0=k+2n\pi/h$ where n is an integer, we may obtain the same set of equations because of the exponential $e^{jk_0 h} = e^{jk \cdot h}$: in Eq. (1.8). As an example, two common materials, concrete and rubber, are used to fabricate the periodic foundation. The thickness of both layers are $h_1=h_2=0.2$ m. FIGS. 6A-6B presents the variations of frequencies $\omega$ for both transverse wave and longitudinal wave as a function of the reduced wave number k in the first Brillouin zone. The introduction of inhomogeneities implies the opening of a gap at the Brillouin zone boundary $k=-\pi/h$ or $k=\pi/h$. The curves are related to real wave numbers and the frequency band gaps are related to complex wave numbers (evanescent wave), which are not calculated and don't appear in FIGS. 6A-6B. For transverse wave, the first four band gaps are: 6.6 Hz-15.0 Hz, 17.8 Hz-30.0 Hz, 31.6 Hz-45.0 Hz and 46.1 Hz-60 Hz. For longitudinal modes, the first band gap starts from 25.0 Hz to 57.2 Hz and the second band gap is 67.9 Hz-114.3 Hz. Notice that the rubber layers used in this design will not produce a large horizontal displacement as is the case for the rubber layers in the laminated elastomeric seismic isolator. This is so because the motion is reflected from the periodic material. In the shake table test discussed below, the results show that the horizontal displacement at the rubber layer is quite small.

Numerical Harmonic Analysis

Figure 7A:
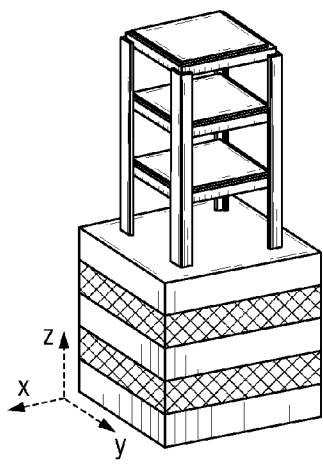
FIG. 7A is an illustrative embodiment of a finite element model.

To show the isolation characteristic of the periodic structure, as shown in FIG. 7a, an ANSYS finite element model is built for a three-story steel frame with the layered periodic foundation consisting of three reinforced concrete layers and $$\begin{bmatrix} \sin(\omega h_1/C_{t1}) & \cos(\omega h_1/C_{t1}) & 0 & -1 \\ \mu_1 C_{t2} \cos(\omega h_1/C_{t1}) & -\mu_1 C_{t2} \sin(\omega h_1/C_{t1}) & -\mu_2 & 0 \\ 0 & e^{jk \cdot h} & -\sin(\omega h_2/C_{t2}) & -\cos(\omega h_2/C_{t2}) \\ \mu_1 C_{t2} \cdot e^{jk \cdot h} & 0 & -\mu_2 C_{t1}\cos(\omega h_2/C_{t2}) & \mu_2 C_{t1}\sin(\omega h_2/C_{t2}) \end{bmatrix} \begin{bmatrix} A_1 \\ B_1 \\ A_2 \\ B_2 \end{bmatrix} = 0 \qquad 1.8$$

two rubber layers. The system is strictly theoretical for preliminary analyses. Denote $u_x$, $u_y$ and $u_z$ as the displacement in x, y and z direction, respectively.

Figure 7B:
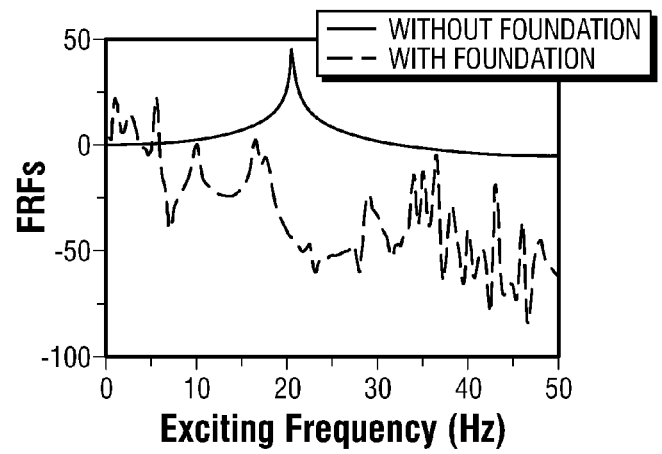
FIGS. 7B-7C respectively show Frequency Response Functions (FRFs) under horizontal and vertical ground motion.

Firstly, a horizontal harmonic ground motion with amplitude $\delta_i$ in x direction is applied to the bottom of the foundation. The other DOFs of the bottom are fixed, i.e., $u_y=0$ and $u_z=0$. FIG. 7b gives a comparison between the transmitting Frequency Response Functions (FRFs) of the system with the periodic foundation and without foundation. The FRF in the vertical axis defined as $20\log(\delta_0/\delta_i)$ where $\delta_0$ is the amplitude of displacement of the point A, as shown in FIG. 7a, at the top of the frame. Note that if the input and output displacements are the same then the log will be 0. Therefore, a negative number in FRF indicates a very effective isolation of the structure. As shown in prior section, the first two band gaps for S-wave in the periodic foundation are 6.6 Hz-15.0 Hz and 17.8 Hz-30.0 Hz. In the band gaps, the response is significantly reduced. It is worth mentioning that the natural frequency of the frame falls into the band. As it is well known, the excitation of a building at or near the fundamental frequency of the building will result in resonance. Resonance of the structure will lead, in turn, to magnification of the overall building response and likely result in serious damage. When the excitation frequency is an integer multiple of the fundamental frequency of the building, resonance will also occur. The multiple band gaps may be thought of as the inverse of the fundamental frequency multiples and indicate that in a periodic structure the excitation input at the structure's fundamental frequency and its multiples will be blocked, avoiding resonance at both the fundamental frequency and its integer multiples.

Figure 7C:
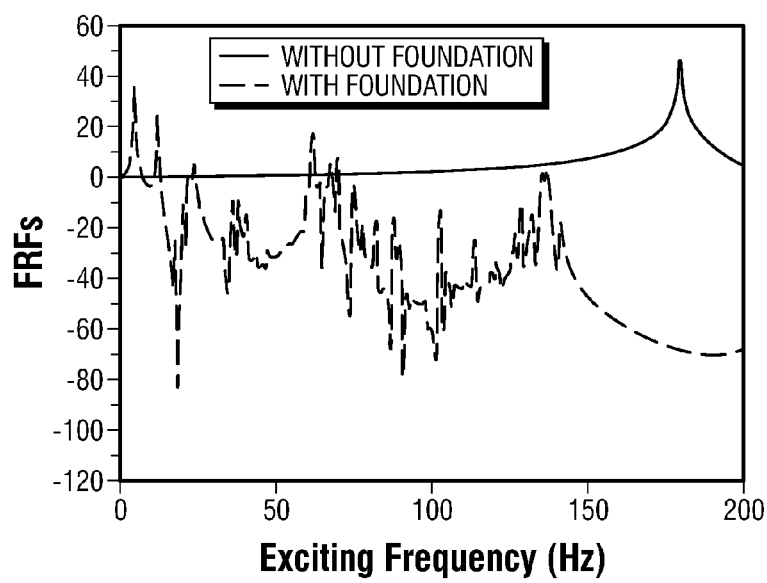

Secondly, a vertical harmonic ground motion is applied to the bottom of the periodic foundation and the other DOFs of the bottom are fixed, i.e., $u_x=0$ and $u_y=0$. For P-wave, the first two band gaps in the foundation are: 25.0 Hz-57.2 Hz and 67.9 Hz-114.3 Hz. Again, the dynamic response is also reduced when the exciting frequency of the ground motion falls into the band gap as shown in FIG. 7c. The results indicate that the periodic foundation can serve as a multi-dimensional seismically isolated foundation. When the periodic foundation is replaced by the previously mentioned 2D or 3D periodic foundation, vibration attenuation can be found in a similar way.

Experimental Results

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Experimental Validation:

A scaled model and a periodic foundation were fabricated and recently tested using the shake table facility at the National Center for Research on Earthquake Engineering (NCREE) in Taiwan.

Material Properties and Dimensions of Test Specimens

Figure 8A:
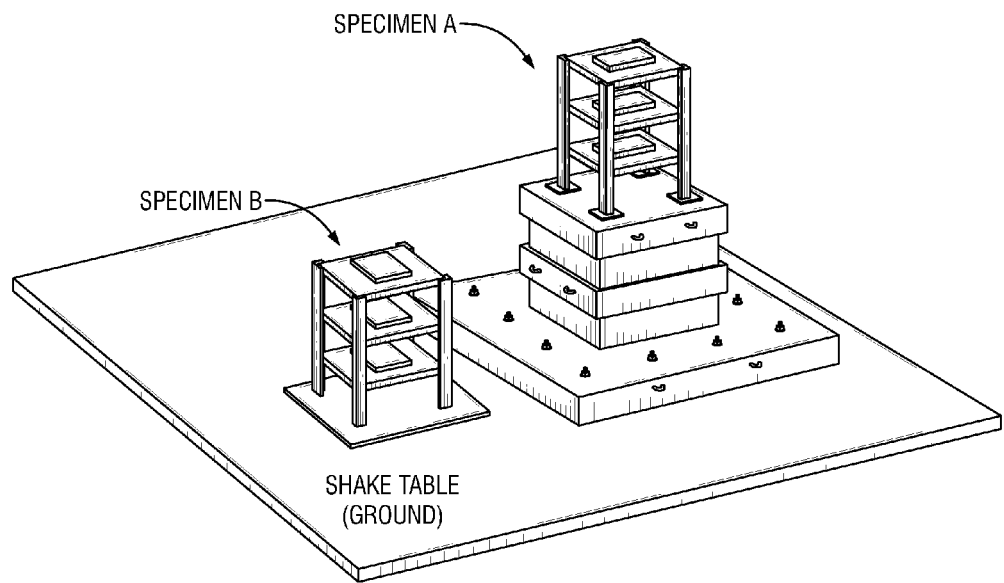
FIGS. 8A-8B are illustrative embodiments of a test setup for a 1D periodic foundation.
Figure 8B:
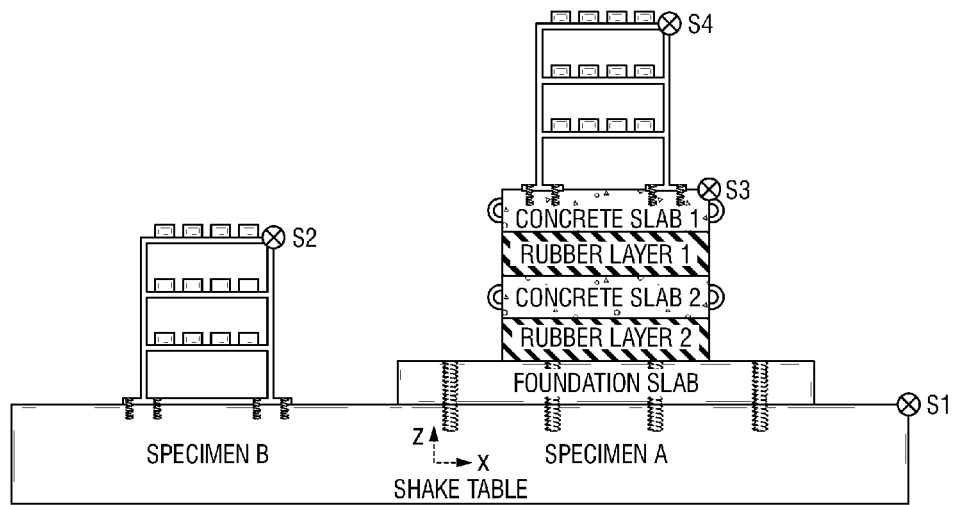
Figure 9:
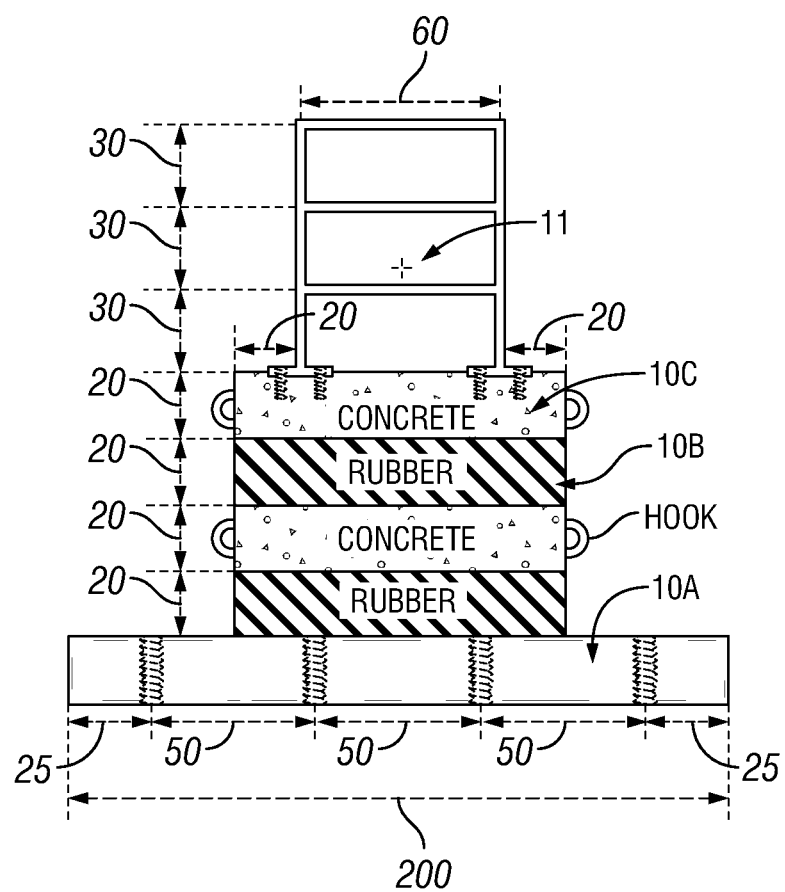
FIG. 9 is a lateral view of a 1D periodic foundation.
Figure 10A:
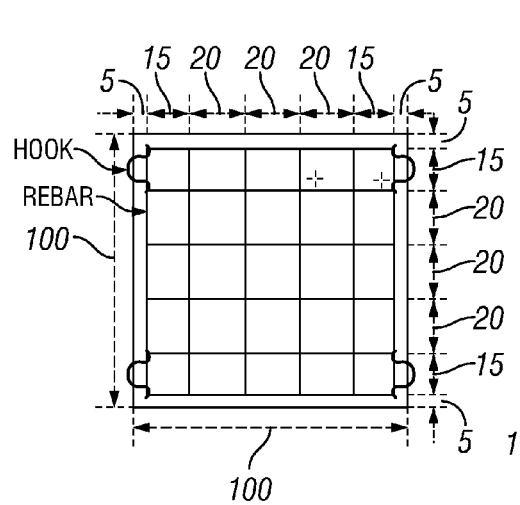
FIGS. 10A-10C illustrate geometric properties of the periodic foundation.
Figure 10B:
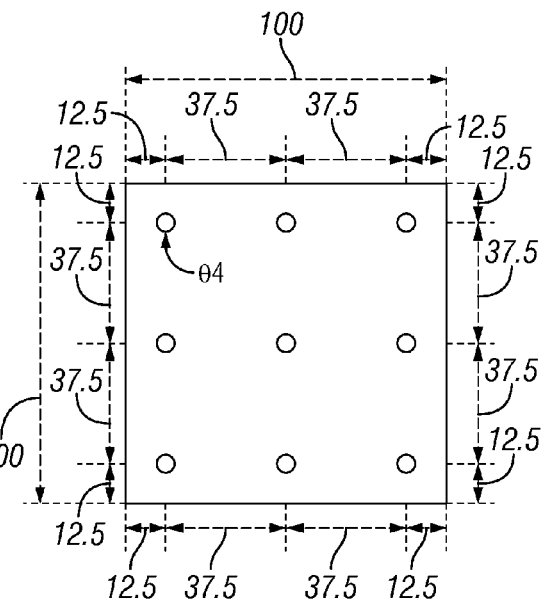
Figure 10C:
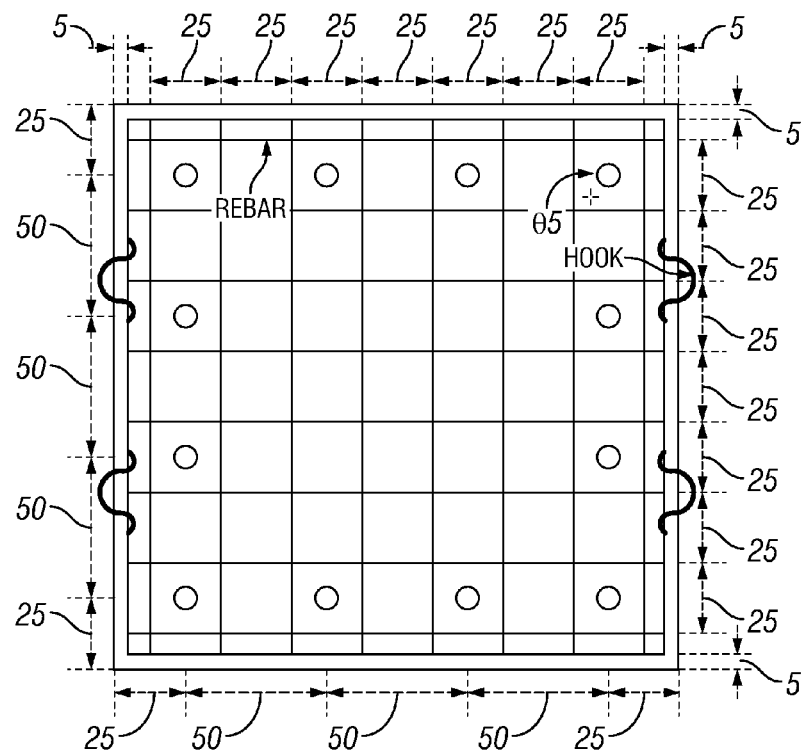
Figure 11A:
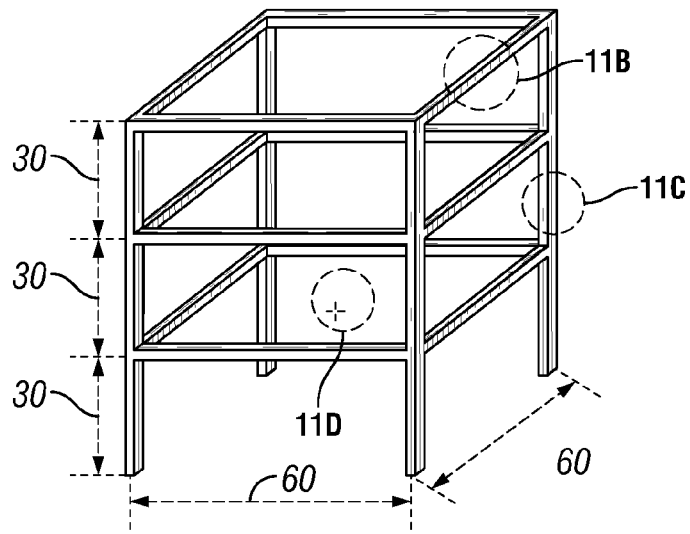
FIGS. 11A-11D illustrate geometric properties of a steel frame.
Figure 11B:
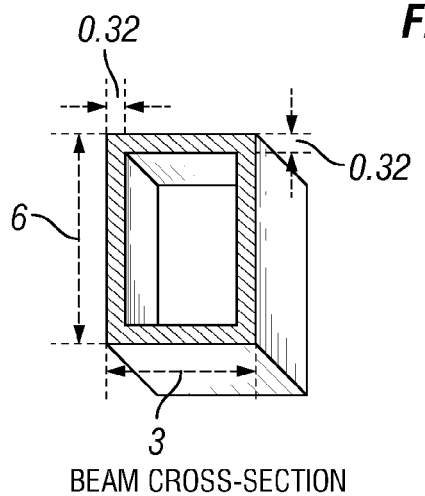
Figure 11C:
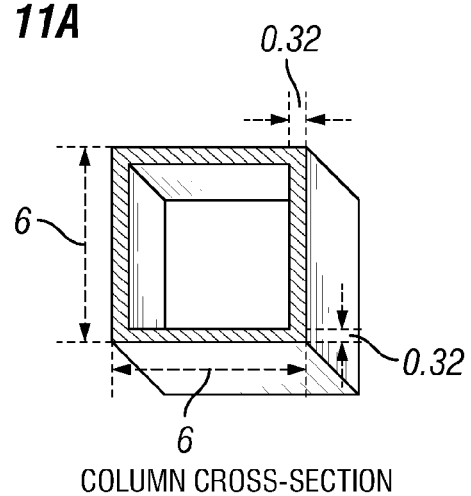
Figure 11D:
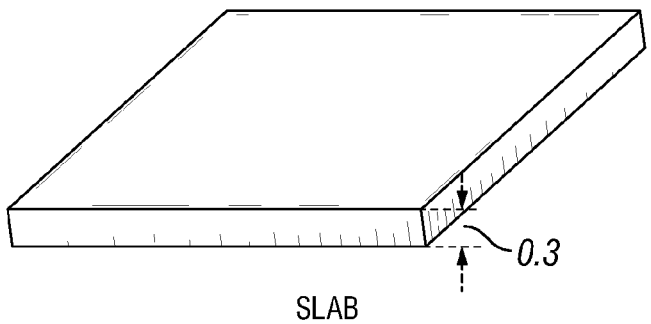

As shown in FIGS. 8A-8B, specimens A and B are the same scaled-down three-story steel frame, but A is on a 1D layered periodic foundation and B is fixed on the shake table. A lateral view of specimen A is shown in FIG. 9. The detailed geometric properties of the periodic foundation and steel frames are shown in FIGS. 10 and 11A-11D, respectively. The periodic foundation is composed of three concrete layers and two rubber layers with the material properties as listed in table 1. The height and plane dimensions of each concrete or rubber layer are accordingly 20 cm and 100 cm×100 cm (except that the bottom concrete layer has a different plane dimension, i.e. 200 cm×200 cm, in order to be mounted on the shake table). Rebars of ⅜ in. diameter and spacing from 15 cm to 25 cm are designed in the concrete layer. The concrete and rubber layers are bonded together by polyurethane (PU) glue for which the anti-pull and anti-tear strengths are normally larger than 1 MPa and 6 MPa, respectively. Therefore, considering a total contact area, the resultant nominal anti-pull and anti-tear forces of the PU glue between the rubber and concrete layers should exceed 1000 kN and 6000 kN, respectively. The calculated nominal strengths are very conservative to prevent any loss of bond between the rubber and concrete layers during the shake table tests, as assumed in the numerical study. (This because considering the possible maximum mass of specimen A, i.e. 1.5 tons, and the driven-acceleration capacity of the shake table, i.e. 3 g, the predicted maximum shear force across the rubber and concrete layers is approximately 45 kN, which is much less than the calculated nominal strengths of the PU glue.) Besides, in the steel frames, the columns are simulated by a square tube with a sectional dimension of 6 cm (breadth)×6 cm (depth)×0.32 cm (thickness) and the beams are simulated by a rectangular tube with a sectional dimension of 3 cm (breadth)×6 cm (depth)×0.32 cm (thickness); the slabs are 0.3 cm thick. The height and plane dimensions of each story of the steel frames are 30 cm and 60 cm×60 cm, respectively.

TABLE 1

Material constants.

| Materials | Young's modulus | Poisson's ratio | Density (kg m$^{-3}$) |
|---|---|---|---|
| Steel | 205 GPa | 0.280 | 7850 |
| Concrete | 25 GPa | 0.330 | 2300 |
| Rubber | 147 kPa | 0.463 | 1300 |

Test Setup

As shown in FIGS. 8A-8B, the three-story steel frame on a 1D layered periodic foundation (i.e. Specimen A) and its fixed-base counterpart (i.e. Specimen B) were installed together on the shake table in order to have a good comparison under the same excitation inputs. The 5 m×5 m shake table has the capability of six DOFs to perform a realistic ground motion in three directions. The additional mass assigned to each floor of the steel frames is 20 kg with a regular plane arrangement. Traditional measuring instruments including accelerometers and displacement transducers (linear variable differential transformers, LVDTs) together with a vision-aided measurement system were used to capture the concerned dynamic responses at the steel frames and periodic foundation during the shake table tests. The installation layout of the measuring instruments is also illustrated in FIG. 8B. The reference steel frame in FIGS. 8A-8B was used for the installation of displacement transducers.

Test Procedures

In order to comprehensively discuss the effectiveness of the periodic foundation, ambient vibration (test I), seismic loading (test II), and harmonic excitation (test III) were considered in this shake table test scheme, as summarized in table 2. In test I, the main frequency of the recorded ambient vibration is about 50 Hz, which is assumed to be mainly induced by the shake table engine operation. In test II, the 1975 Oroville seismogram obtained from the PEER Ground Database was used as the input motion. The horizontal and vertical target test peak ground acceleration (PGA) values were respectively scaled to 0.418 g and 0.212 g, which are 200% of the original recorded PGA values. In test III a sine wave with an amplitude of 0.1 cm and an excitation frequency of 6 Hz was used for the harmonic test. Note that tests II and III were subjected to biaxial (one in the horizontal direction and another in the vertical direction) and uniaxial (one in the horizontal direction) excitations, respectively. In addition, the control algorithms of the shake table for tests II and III are acceleration control and displacement control, respectively.

TABLE 2

Test procedures.

| Test number and name | Input excitation | Control algorithm | Input direction | | Peak acceleration | Amplitude (cm) | Frequency (Hz) |
|---|---|---|---|---|---|---|---|
| Test I: ambient vibration test | Ambient vibration | None | Varied | | Varied | Varied | Varied |
| Test: II seismic test | 1975 Omville seismogram (PEER Ground Database) | Acceleration | Biaxial | Horizontal Vertical | 0.418 g 0.212 g | Varied Varied | Varied Varied |
| Test: III harmonic test | Sine wave | Displacement | Uniaxial | Horizontal | Varied | 0.1 | 6 |

Experimental Results

Test I: Ambient Vibration Test.

Figure 12:
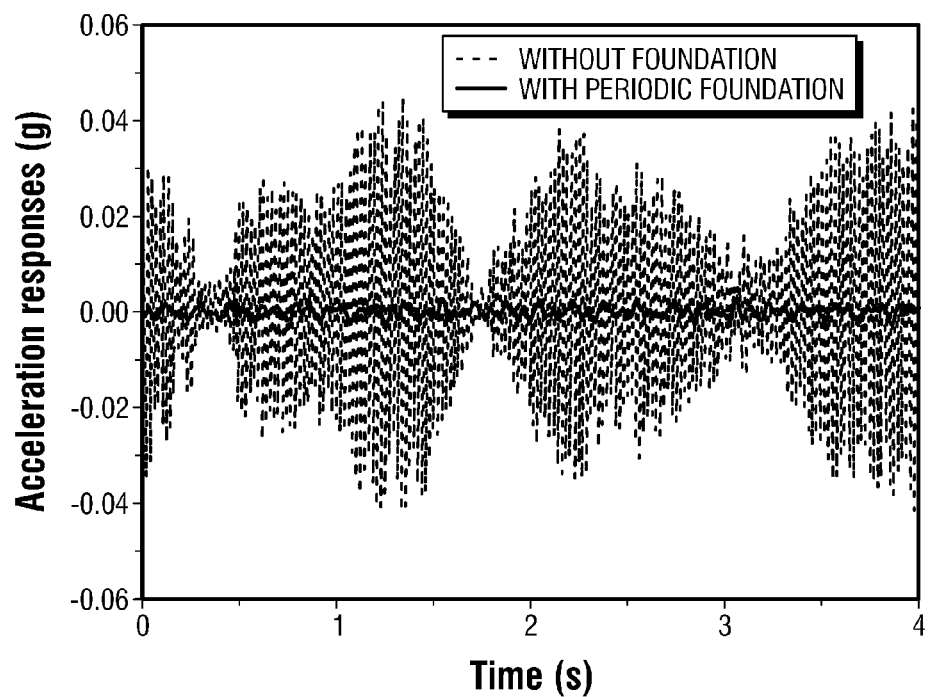
FIG. 12 shows dynamic responses induced by ambient vibration.

The main frequency of the recorded ambient vibration, i.e. about 50 Hz, should fall into the fourth band gap of the periodic foundation as shown in FIG. 6A. The horizontal acceleration time histories at the top story of the frames with and without the periodic foundation are shown in FIG. 12. It can be seen from FIG. 12 that for the frame on the periodic foundation (i.e. specimen A), the acceleration response history is reduced significantly compared to that of the frame without the periodic foundation (i.e. specimen B). The peak acceleration responses of specimens A and B are 0.003 g and 0.046 g, respectively (the reduction attributed to the implementation of the periodic foundation is about 93.5%). The test result indicates that the periodic foundation is capable of acting as an effective filter to isolate the ambient vibration in which the frequency contents fall into the desired band gap.

Test II: Seismic Test.

Figure 13:
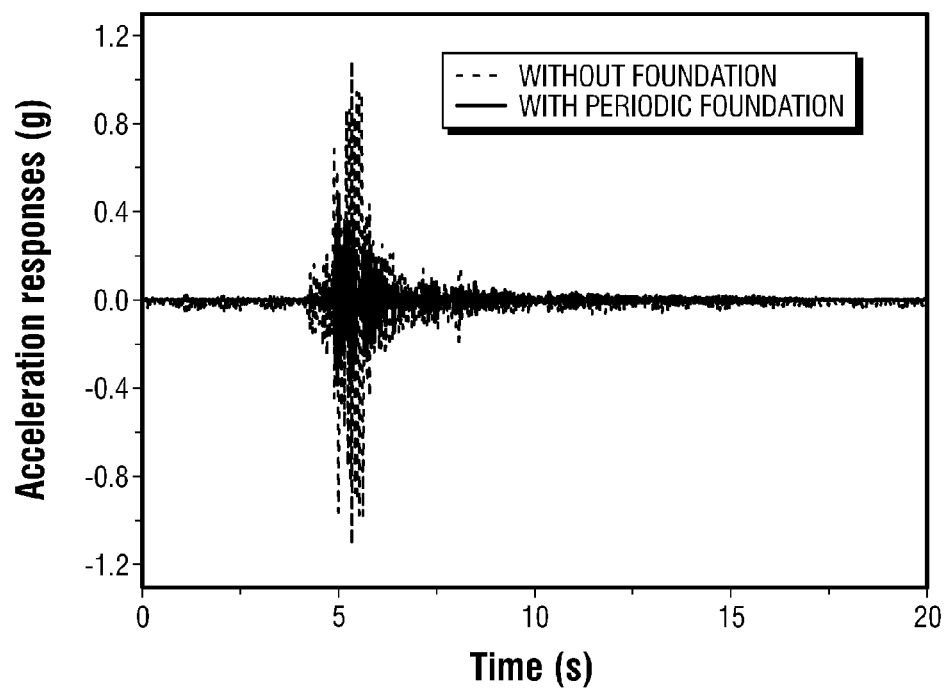
FIG. 13 shows horizontal acceleration time histories at the top story of the frames with and without the periodic foundation.

The main frequency contents of the adopted seismogram fall into the second band gaps of the periodic foundation (i.e. 17.8-30.0 Hz). The horizontal acceleration time histories at the top story of the frames with and without the periodic foundation are shown in FIG. 13. It is found from FIG. 13 that for the frame on the periodic foundation (i.e. specimen A), the peak horizontal acceleration is reduced by as much as 50% compared to that of the frame without the periodic foundation (i.e. specimen B).

Figure 14:
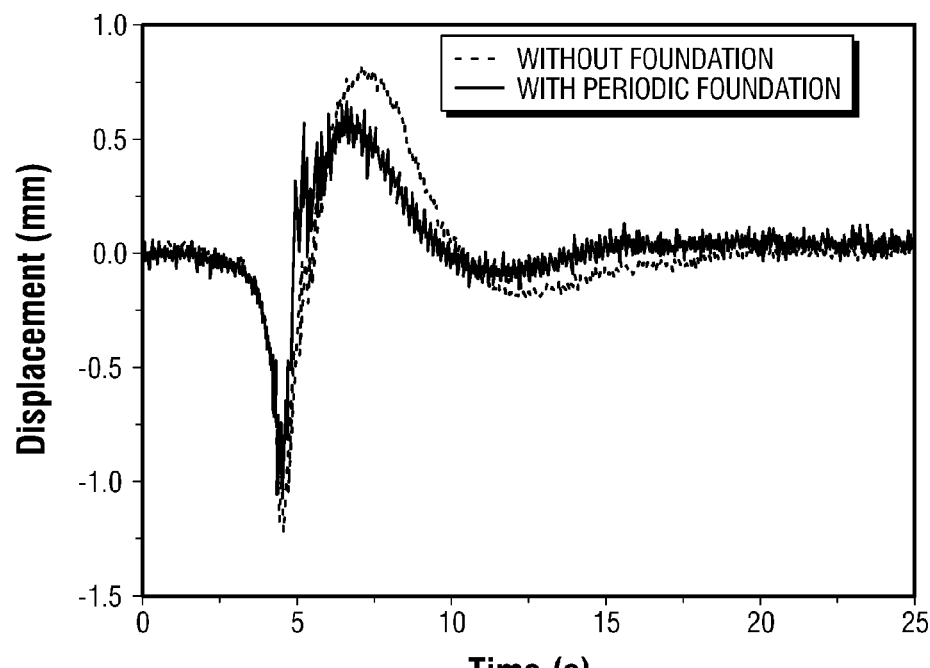
FIG. 14 shows vertical displacement time history at the top of the frames.

As discussed previously, there are transverse and longitudinal band gaps in the periodic foundation, so the vertical displacement responses of the specimens can highlight that the periodic foundation has a good potential to isolate vertical vibration also. As shown in FIG. 14, the reduction of the peak vertical displacement due to the implementation of the periodic foundation is about 15.9%. These test results are promising and support that the periodic foundation can serve as a multi-dimensional base isolation.

Test III: Harmonic Test.

Figure 15:
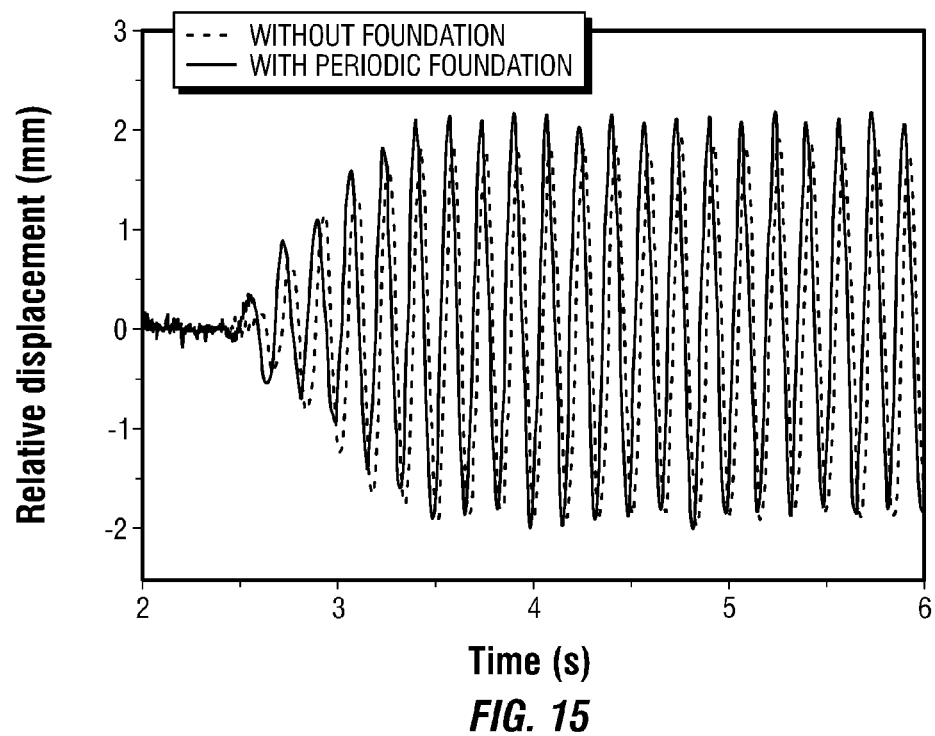
FIG. 15 shows relative horizontal displacement of the top of the frames.

The harmonic test with an excitation frequency of 6 Hz was performed to examine the dynamic response of the frame on the periodic foundation (i.e. specimen A) when the excitation frequency is out of the desired band gaps. The displacements of the top story relative to the bottom of the frames in the horizontal direction are shown in FIG. 15. Note that the displacement command of the control algorithm is increased at the beginning and then tends to a harmonic motion with constant amplitude. It can be observed from FIG. 15 that the relative displacement in the frame on the periodic foundation (i.e. specimen A) is slightly larger than that without the periodic foundation (i.e. specimen B). The peak displacement responses are 2.2 mm and 1.9 mm for specimens A and B, respectively. The numerical results also show that the amplitude of relative displacement for specimen A (1.75 mm) is larger than that for specimen B (1.54 mm). This result predicts that the periodic foundation is not effective in attenuating vibrations when the exciting frequency is outside the band gaps, which coincides with the numerical prediction, and does not lead to a significantly worse response compared to the fixed foundation.

Conclusions:

A layered periodic foundation is designed to mitigate potential seismic damage to structures. Unlike traditional seismic isolators, such as lead-rubber bearings, high damping rubber bearings or friction pendulum bearings, the isolation mechanism of the periodic foundation is that periodic composite can block and reflect seismic waves. Therefore, the periodic foundation can serve as a multi-dimensional isolator. By proper design, one can adjust the frequency band gap to contain the relevant frequency range of strong earthquakes, so the possible strong component of seismic waves will be blocked or reflected effectively. This periodic foundation, then, can filter out the strong motion with specific frequencies that structures may be subjected to. Or, alternatively, one can adjust the frequency band gap to match the fundamental frequency of the superstructure so that the motion transmitted through the periodic foundation does not contain this frequency. Both theoretical and experimental results disclose that strong vibration attenuation is feasible. The reduction of peak horizontal acceleration can be as much as 50% and the vertical response can be reduced by 15.9% when the exciting frequency falls into the band gaps. Thus, the proposed periodic foundation is suitable for isolating environmental vibration with frequencies falling into the band gaps. Moreover, the periodic foundation can be served as a multi-dimensional base isolation.

Theory Relating to 2D Periodic Materials

Consider a particle in an isotropic linear elastic solid of infinite extension. In the absence of external forces, and omitting damping, the governing equations in XY plane of vibration for continuum, are $$(\lambda + 2\mu)\frac{\partial^2 u}{\partial x^2} + \mu\frac{\partial^2 u}{\partial y^2} + (\lambda + \mu)\frac{\partial^2 v}{\partial x \partial y} = \rho\frac{\partial^2 u}{\partial t^2} \qquad 2.1$$

$$(\lambda + 2\mu)\frac{\partial^2 v}{\partial y^2} + \mu\frac{\partial^2 v}{\partial x^2} + (\lambda + \mu)\frac{\partial^2 u}{\partial x \partial y} = \rho\frac{\partial^2 v}{\partial t^2} \qquad 2.2$$

Where u and v are displacements in the X and Y directions, respectively; p is the material density; $\lambda$ and $\mu$ are the Lame constants. Eqs. (2.1) and (2.2) are derived from the phononic crystal theory.

To solve the governing equations, the Plane Wave Expansion (PWE) method was used. According to the Bloch theorem, the material constants in Eqs. (2.1) and (2.2) may all be expanded in a Fourier series. Together with the periodic boundary conditions, as well as taking into account the stress and strain relationships, one can obtain the characteristic equations for the XY mode of periodic structures, i.e. Eqs. (2.3) and (2.4):

$$\omega^2 \sum_{G'} \rho(G'' - G') u_{k+G'} = \qquad 2.3$$

$$\sum_{G'} [\alpha(G'' - G')(k + G')_x(k + G'')_x + \mu(G'' - G')(k + G')_y(k + G'')_y]$$

$$u_{k+G} + \sum_{G'} [\beta(G'' - G')(k + G')_y(k + G'')_y +$$

$$\mu(G'' - G')(k + G')_x(k + G'')_y] v_{k+G'}$$

$$\omega^2 \sum_{G'} \rho(G'' - G') v_{k+G} = \qquad 2.4$$

$$\sum_{G'} [\beta(G'' - G')(k + G')_x(k + G'')_y + \mu(G'' - G')(k + G')_y(k + G'')_x]$$

$$u_{k+G'} + \sum_{G'} [\alpha(G'' - G')(k + G')_y(k + G'')_y +$$

$$\mu(G'' - G')(k + G')_x(k + G'')_x] v_{k+G'}$$

Where, $G''=G+G'$, $\alpha=2\mu(4\lambda+\mu)/(2\lambda+\mu)$, and $\beta=4\lambda\mu/(2\lambda+\mu)$. If the wave vector k is given in the First Brillouin zone and G is taken points in the reciprocal space, then a set of eigenvectors $u_{k+G'}$ and eigenvalues $\omega$ can be obtained. In other words, to get the dispersion curve, selecting wave vector k in the First Brillouin zone with three vertices $\Gamma$, X and M, a series of $\omega$ can be obtained.

Figure 16:
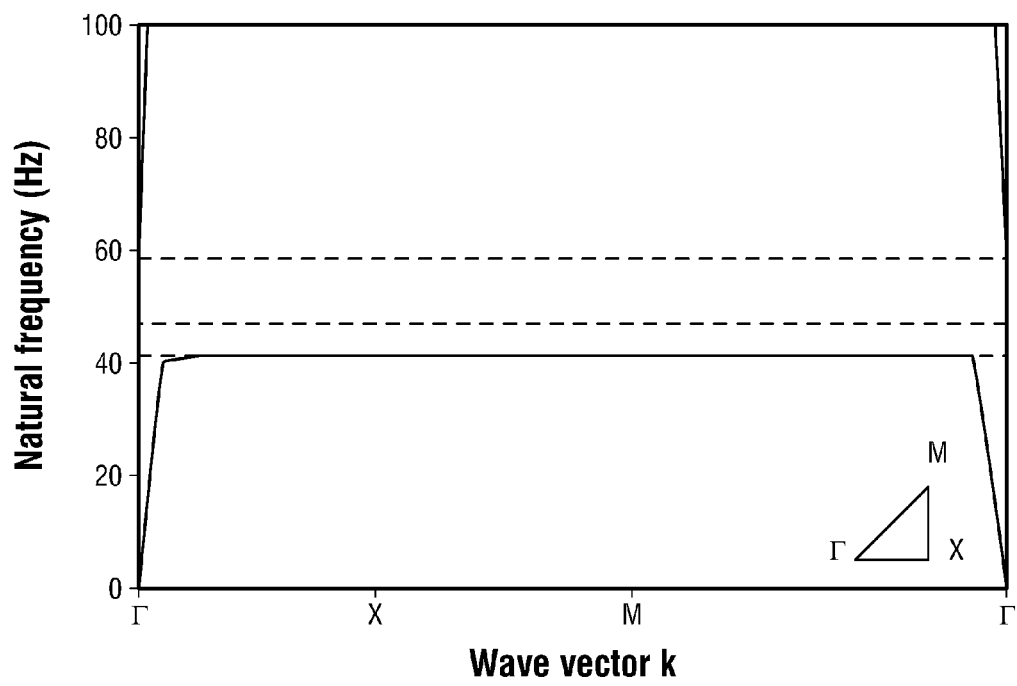
FIG. 16 shows attenuation zones for 2D periodic foundation.

FIG. 16 shows the relationship between the wave vector k and eigenvalues $\omega$ of the 2D periodic foundation with the geometric and material properties in the following sections. The wave vector travelling through three vertices $\Gamma$, X and M of the First Brillouin zone as shown in the horizontal axis in FIG. 16 and the corresponding $\omega$ are shown in the vertical axis in FIG. 16. The frequency band, 40 Hz-60 Hz, is shown as the frequency band gap, which means the propagation of the wave is blocked.

Finite Element Analysis

Geometric and Material Properties

Figure 17:
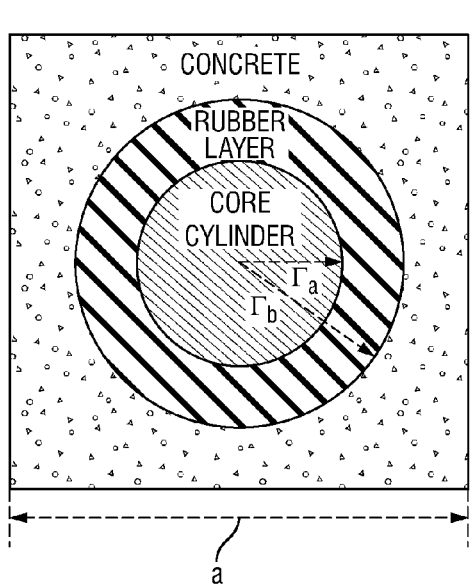
FIG. 17 shows a unit cell for a 2D periodic foundation.

Many variables may affect the frequency band gaps and their widths of the 2D periodic foundation. In order to obtain the lower frequency band gap and wider band width, the finite element model of one unit cell, shown in FIG. 17, was set up to conduct the parametric analysis. The results are summarized below.

1) With the increase of core cylinder density, the starting frequency of the first band gap is lower.

2) If the Young's modulus of the rubber is small, the starting frequency of the first band gap is low.

3) With the increase of the filling ratio, the starting frequency of the first band gap will decrease.

4) When the ratio of the radius of the core cylinder to the thickness of rubber layer equals 1.5, the starting frequency of the first band gap reaches its minimum value.

Therefore, the following geometric properties and the material properties are used in the finite element analysis and the following experimental program. The geometric properties of the test specimens are listed in Table 3. The material properties are shown in Table 4.

TABLE 3

Geometric properties for one unit cell

| Part | Material | Dimension |
|---|---|---|
| Core cylinder | Ductile cast iron | Diameter ($r_a$) = 0.12 m. |
| Rubber coating | Supper soft rubber (Duro 10) | Outer diameter ($r_b$) = 0.2 m. |
| Matrix | Reinforced Concrete | Length of unit cell (a) = 0.254 m. |

TABLE 4

Material properties

| Material | Density (kg/m³) | Young's Modulus (Pa) | Poisson's ratio |
|---|---|---|---|
| Ductile cast iron | $7.184 \times 10^3$ | $1.65 \times 10^{11}$ | 0.275 |
| Supper soft rubber | $1.196 \times 10^3$ | $5.7 \times 10^5$ | 0.463 |
| Steel | $7.85 \times 10^3$ | $2.05 \times 10^{11}$ | 0.28 |
| Concrete | $2.3 \times 10^3$ | $3.144 \times 10^{10}$ | 0.33 |

Simulation and Results

An ABAQUS model was set up to get the dynamic characteristics of the specimen. The dimension of the frame and the additional mass assigned on the top of the frame are the same as those used in the test specimen discussed above. The material properties, which are the same as the test specimen discussed above.

Figure 18:
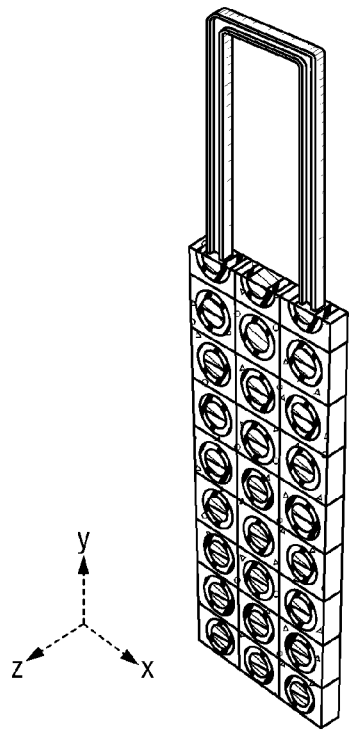
FIG. 18 shows boundary conditions under shear-mode waves.
Figure 19:
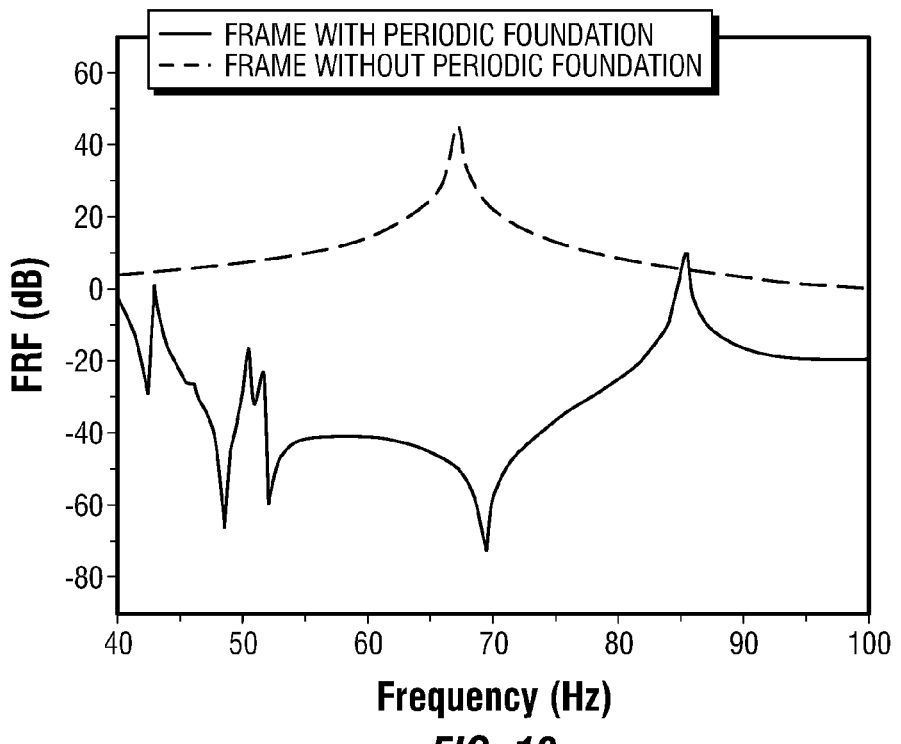
FIG. 19 shows FRF of a node.

For the ABAQUS model, the displacements of the bottom surface in Y and Z directions were fixed, and an instantaneous displacement in the X-direction with an amplitude $\delta_i$ was applied at the bottom, as shown in FIG. 18. These boundary conditions simulate the input motion of the horizontal component of harmonic motion or an earthquake. The displacement in the X direction of node A at the top of the frame is denoted by $\delta_o$. To assess the efficiency of the periodic foundation in the frequency domain, a Frequency Response Function (FRF) is defined as $20 \log(\delta_o/\delta_i)$. When the output $\delta_o$ is equal to the input $\delta_i$, the value of FRF equals zero. When the output displacement is 31.6% of the input displacement, the value of FRF is −10, which means the periodic foundation significantly reduces the propagation of waves. As shown in FIG. 19, the ranges of attenuation zone are 40 Hz-42.5 Hz, 43 Hz-84.5 Hz, 86 Hz-100 Hz. Theoretically, when the input waves fall in the band gaps, the response of the frame can be reduced significantly compared to the frame response without the periodic foundation.

Experimental Program

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Test Setup and Procedures

Figure 20:
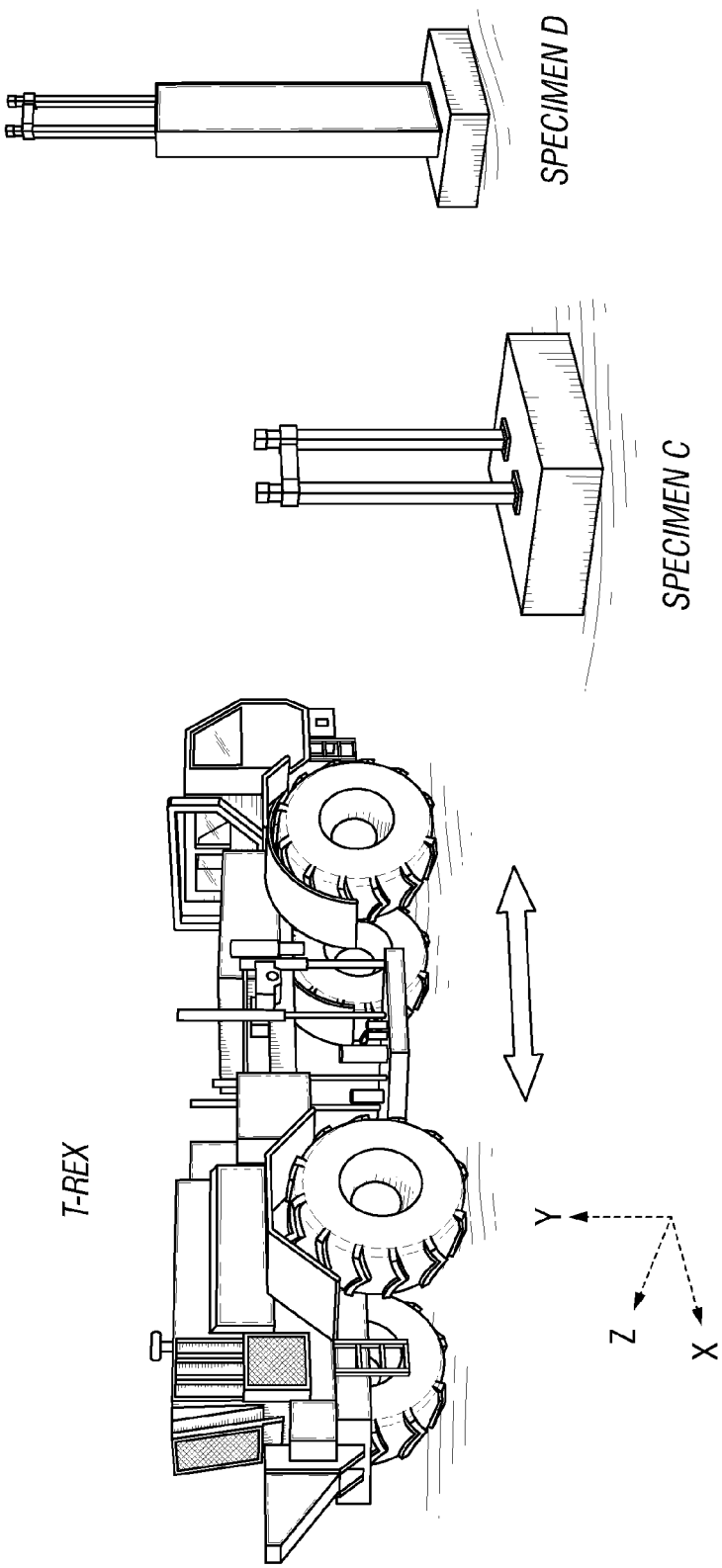
FIG. 20 shows a test setup of two specimens.

Two specimens were tested. FIG. 20 shows the test setup of the two specimens. The dimension and the material properties are the same as discussed above. The reinforced concrete foundation with an upper steel frame is shown as Specimen C and the periodic foundation with an upper steel frame is shown as Specimen D in FIG. 20. Three-dimensional accelerometers were used to measure the acceleration in the X directions. The accelerometers were arranged on the top of the steel frame and on the top of the concrete footings of both specimens.

The input seismic motions were provided by a tri-axial shaker at the University of Texas at Austin named T-Rex (http://nees.utexas.edu). T-Rex is capable of shaking in three directions as: vertical, horizontal in-line and horizontal cross line. For this test, horizontal in-line was used to generate horizontal vibration along the X direction.

Three different types of tests are conducted. Stepped-sine tests were first conducted to determine the frequency band gaps of the periodic foundation. A stepped sine test is a test function provided by the Data Physics SignalCal 730 dynamic signal analyzer. It is comparable to the scanning frequency analysis in FEM analyses. Fixed frequency sine waves from 100 Hz down to 40 Hz were applied to the test specimens according to the numerical analysis results in the simulation and results section above. Amplitudes and phases of each sensor at each frequency step were recorded. Based on stepped-sine test results, harmonic excitations with a fixed frequency were applied to the specimens. In the last step, seismogram obtained from the Pacific Earthquake Engineering Research (PEER) Ground Database was used as the input motion for the seismic tests. In the last two tests, time histories of each sensor were recorded.

Stepped Sine Tests and Results

Figure 21:
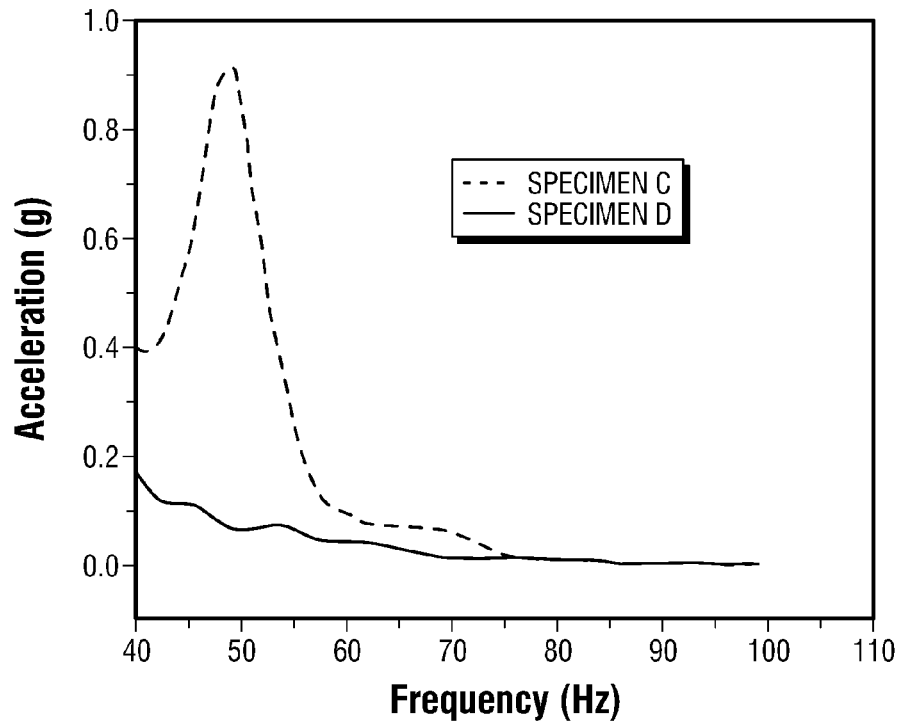
FIG. 21 shows the acceleration at the top of specimens.
Figure 22:
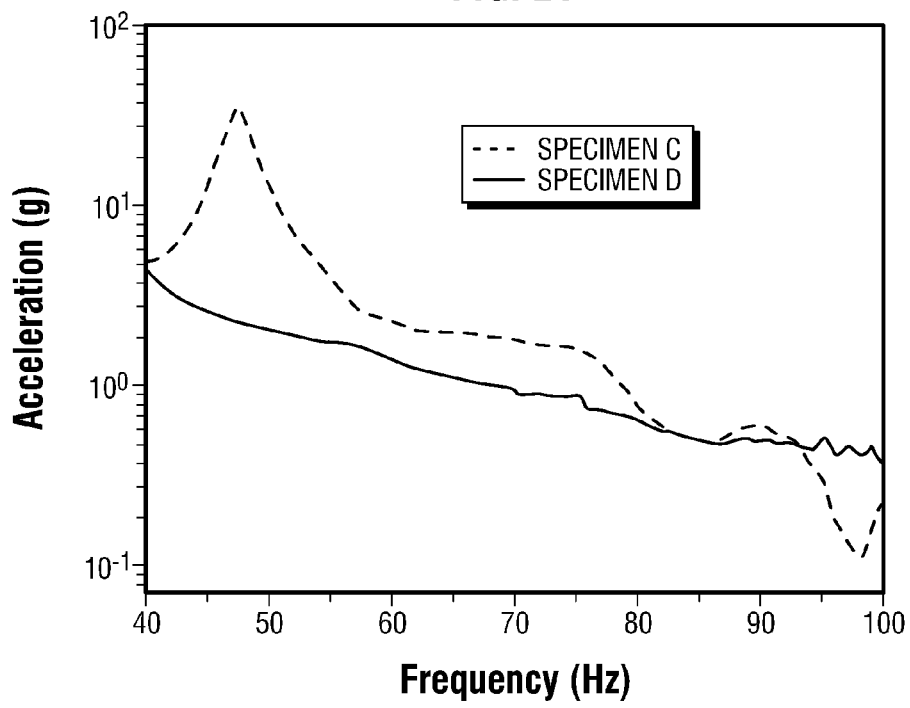
FIG. 22 shows the transfer functions from both specimens.
Figure 23:
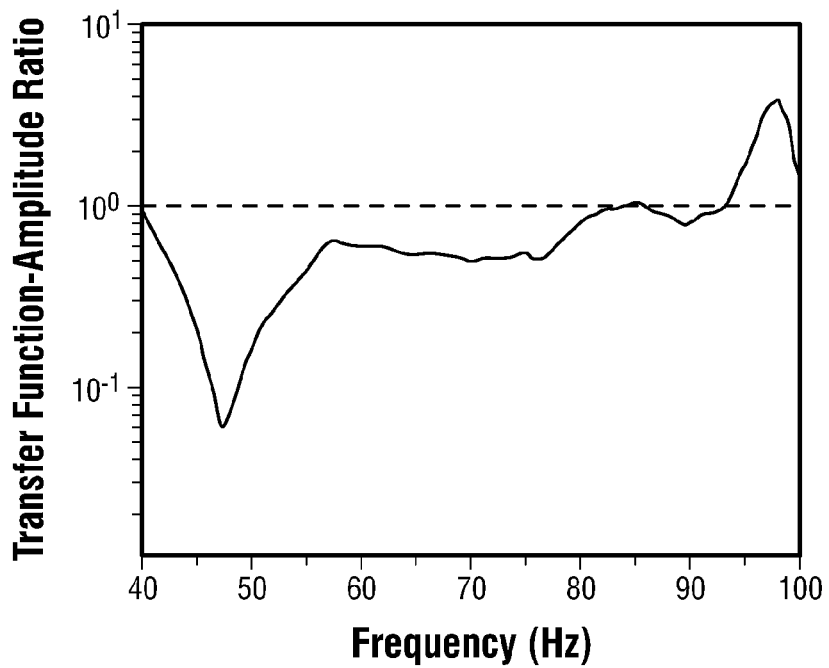
FIG. 23 shows the ratio of transfer function.

FIG. 21 shows the acceleration in X direction measured on top of the two steel frames from the stepped sine tests. As shown in the figure, steel frame on Specimen C experienced a higher level of acceleration at most frequencies, and especially at 50 Hz. Although not shown here, both foundations were subjected to similar level of shaking. To eliminate possible differences of shaking levels between the two foundations, the acceleration on top of the steel frame were normalized by the acceleration measured on the foundations. FIG. 22 shows the amplitudes of the transfer functions from both specimens. The transfer function is the ratio between the acceleration measured on the top of the frame to that measured on the concrete foundation. When the amplitudes of the transfer functions of Specimen D are less than those of Specimen C, seismic motions are isolated by the periodic foundation. As shown in FIG. 22, band gaps are in the frequency ranges of 40 Hz-84 Hz and 86 Hz-93 Hz. To better illustrate the test results, the ratio of transfer function from Specimen D to the transfer function from Specimen C are plotted in FIG. 23. Band gaps are where the ratio is smaller than 1 (below the black dash line shown in FIG. 23).

Fixed Sine Tests and Results

Figure 24:
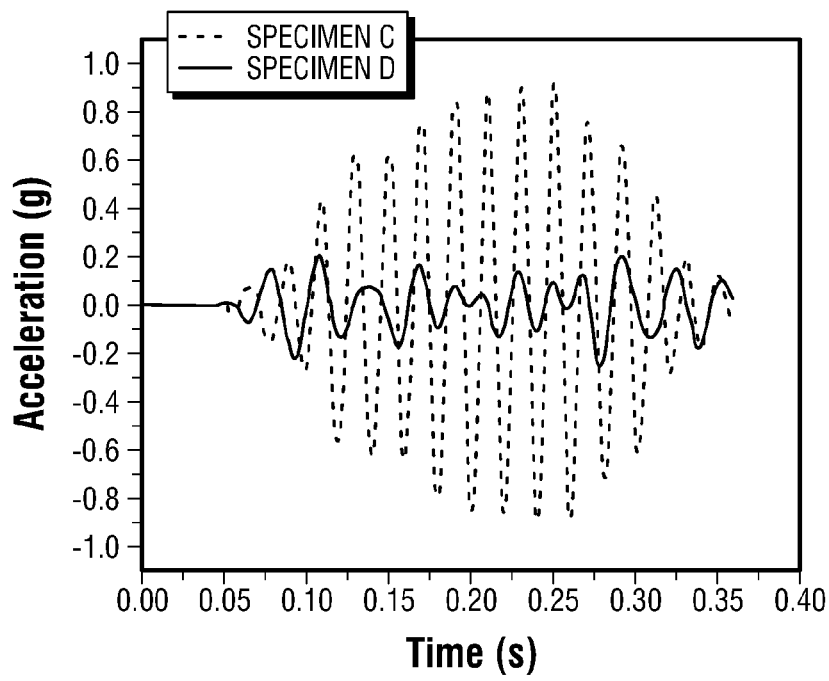
FIG. 24 shows the accelerations in the X direction on the top of the frame under a sine wave with a frequency of 50 Hz.

From the stepped sine tests, the frequency band gaps of the periodic foundation with a steel frame are found to be 40 Hz-84 Hz and 86 Hz-93 Hz. To verify the effect of the frequency band gaps, a single frequency sinusoid wave was applied to the specimens within the range of the band gaps, i.e. 50 Hz. FIG. 24 shows the accelerations in the X direction on the top of the frame under a sine wave with a frequency of 50 Hz. The dashed black curve is the acceleration response on top of the steel frame on a concrete foundation (i.e., Specimen C); while the solid curve is the acceleration at the top of the frame on a periodic foundation (i.e., Specimen D). It can be seen that for the frame on the periodic foundation, the peak acceleration is reduced to 25% of the peak acceleration on the frame without the periodic foundation.

Seismic Tests and Results

Figure 25:
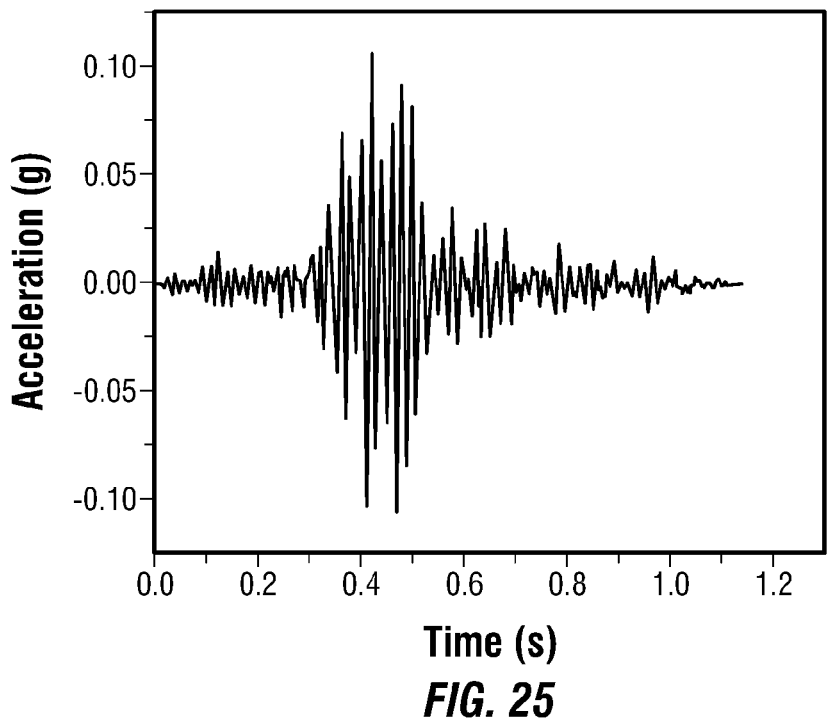
FIGS. 25 and 26 show the modified seismograms in time and frequency domains, respectively.
Figure 26:
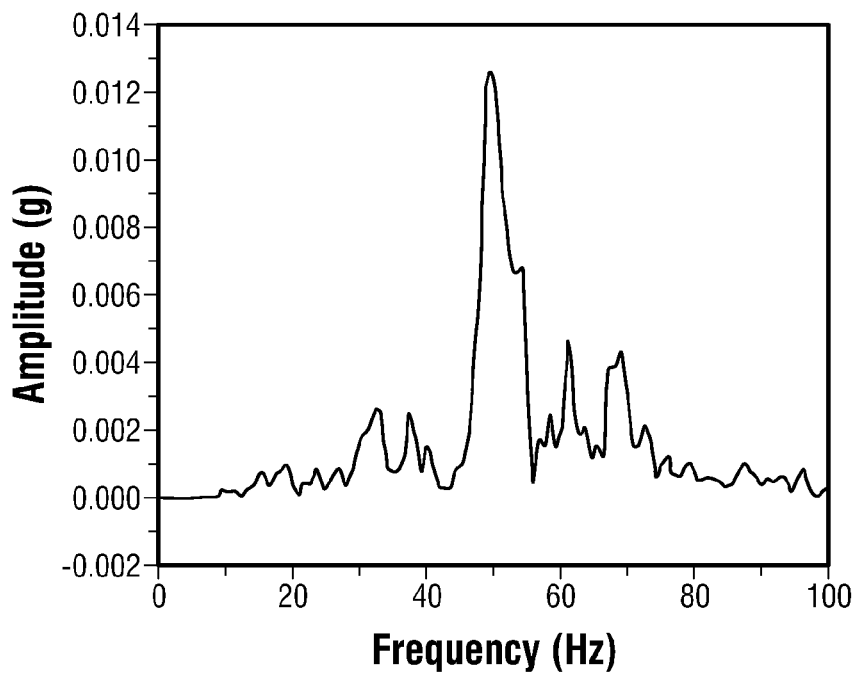
Figure 27:
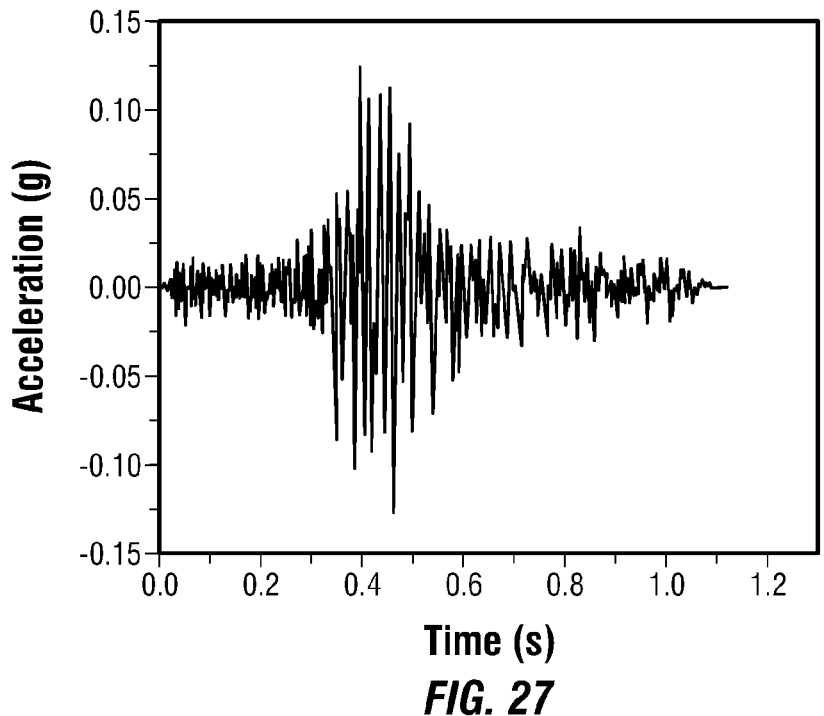
FIGS. 27 and 28 show modified seismograms in both time and frequency domains, respectively.
Figure 28:
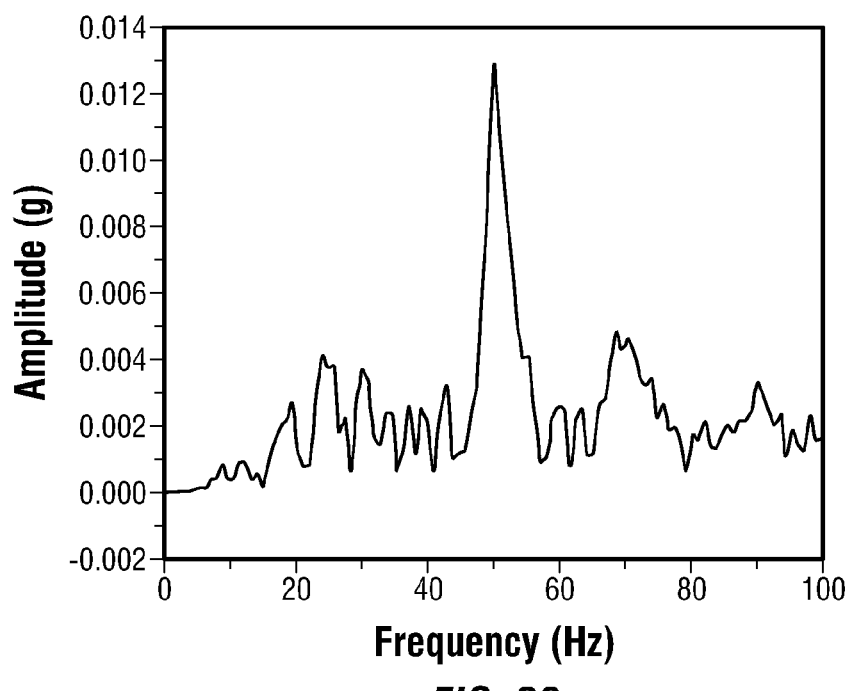

Modified seismograms were used to verify the frequency band gap effects. To find the main frequency of each seismic record, Fourier transformations were used in determining the corresponding frequency spectrum. The frequency at which the amplitude reaches its maximum value is considered as the main frequency. Two seismic records from the PEER Ground Database were used in the field tests, i.e. Bishop (Rnd Val) PO486/MCG-UP (1984 Nov. 23) with the main frequency of 8.3 Hz and Bishop (Rnd Val) PO486/MCG-360 (1984 Nov. 23) with the main frequency of 8.16 Hz. Both seismic records were modified to make the main frequency match the band gaps, i.e. 50 Hz. FIGS. 25 and 26 show the modified seismogram of Bishop (Rnd Val) PO486/MCG-UP (1984 Nov. 23) with frequency of 50 Hz in time and frequency domains, respectively. Additionally, the modified seismogram of Bishop (Rnd Val) PO486/MCG-360 (1984 Nov. 23) in both time and frequency domains are shown in FIGS. 27 and 28.

Figure 29:
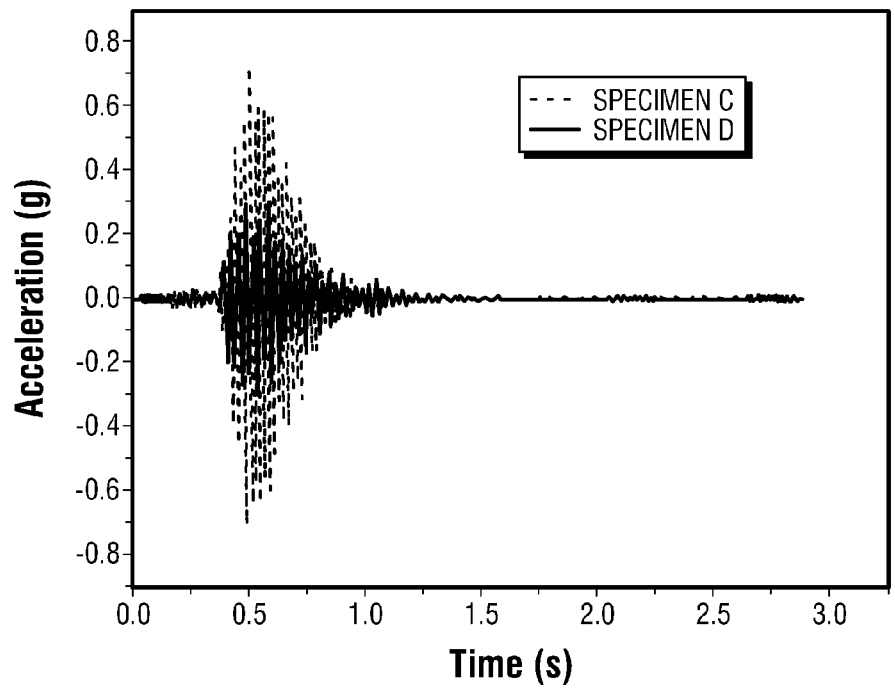
FIG. 29 shows horizontal acceleration time histories under the excitation.
Figure 30:
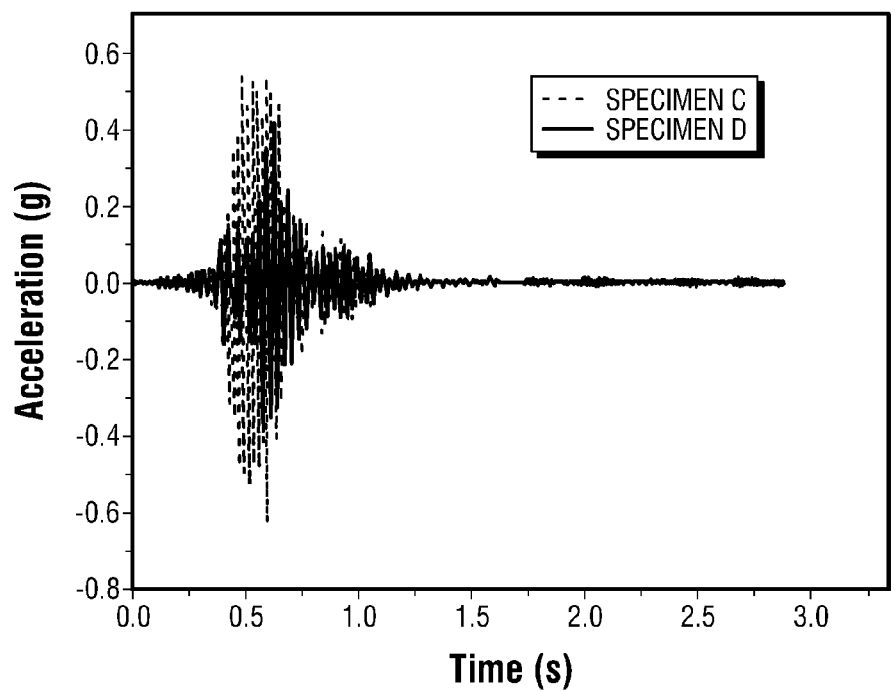
FIG. 30 shows responses of the two specimens under the modified seismogram.

The horizontal acceleration time histories under the excitation of the modified Bishop (Rnd Val) PO486/MCG-UP (1984 Nov. 23) on top of the steel frames from both specimens are shown in FIG. 29. It is found that for the frame on the periodic foundation (i.e., Specimen D), the peak acceleration in the X direction is reduced by as much as 60%, when compared to that of the frame without the periodic foundation (i.e., Specimen C). The responses of the two specimens under the modified seismogram Bishop (Rnd Val) PO486/MCG-360 (1984 Nov. 23) are shown in FIG. 30. The peak acceleration on the top of the frame was reduced by 30%, as compared to the specimen without the periodic foundation. The reductions shown in FIG. 30 is less than those shown in FIG. 29. This is caused by the frequency contents of the input motions. Although the main frequency of the two input motions are at 50 Hz the input motions shown in FIG. 28 has energy in frequency ranges fall outside of the band gaps.

Overall, the test results indicate that the periodic foundation is capable of providing effective isolations for the vibrations fall into the designed band gap.

Comparison of Experimental Results with Analytical Outcomes

The results from the fixed sine tests and the seismic tests show that the periodic foundation can reduce the response of the steel frame significantly when the exciting S-wave frequencies fall into the band gaps. The stepped sine wave test shows that when the exciting frequencies are between 40 Hz-84 Hz and 86 Hz-93 Hz, shown in FIGS. 21 to 23, the acceleration on the top of the frame was reduced due to the periodic foundation. The analytical results in above sections show the band gaps of the periodic foundation are in the ranges of 40 Hz-42.5 Hz, 43 Hz-84.5 Hz, and 86 Hz-100 Hz, as seen in FIG. 19. The experimental results agree fairly well with the finite element analysis.

From the finite element analysis, the band gaps of the periodic foundation fall within the fundamental frequency of the upper steel frame, which will avoid resonance at the fundamental frequency. The harmonic tests show that the periodic foundation can block the S-wave in specified frequency. Therefore, the band gaps of the periodic foundation can be designed to match the fundamental frequency of the upper structure.

CONCLUSIONS

In the field tests performed, the accelerations of the specimens were recorded and analyzed to find the frequency band gaps, and to verify the frequency band gap effects of the periodic foundation. The accelerations on the top of the frame with and without the periodic foundation were compared. According to the test results, the periodic foundation can filter out S-waves with frequencies falling into the band gaps. The acceleration at the top of the frame on the periodic foundation can be reduced by as much as 75%. Moreover, the results of the stepped sine S-wave are consistent with those obtained from the finite element analysis. Theoretical and experimental results confirm the significant vibration attenuation when the exciting frequency falls into the band gaps.

Theory Relating to 3D Periodic Materials

Based on all of these previous studies, this research aims to investigate the feasibility of three-dimensional (3D) periodic foundations. Theoretically speaking, the frequency band gaps of three dimensional periodic structures are the absolute frequency gap, which means that vibrations/waves in the gap cannot propagate in any direction. Therefore, three dimensional periodic foundations are very applicable for multi-dimensional structure vibration isolation.

The feasibility of 3D seismic isolation method by using a periodic foundation is studied based on the theory of elastodynamics. In the following section, two types of 3D three-component periodic structure (cubic lattice with cube or sphere), are investigated. Frequency band gaps is found in a low frequency region <20 Hz. The influences of the material parameters and the geometrical parameters on the frequency band gaps are studied. Numerical simulations about the finite periodic structures are reported afterwards.

Basic Theory: Governing Equations

Figure 31A:
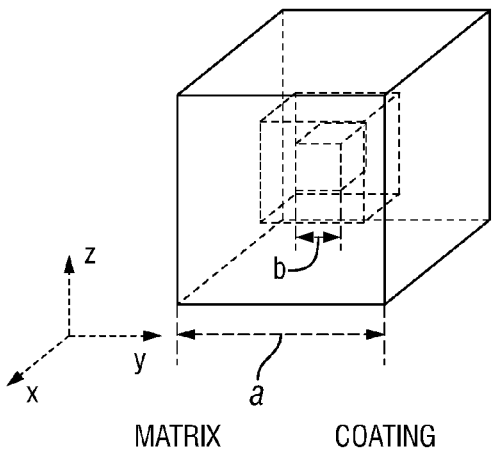
FIGS. 31A-31B show two typical unit cells.
Figure 31B:
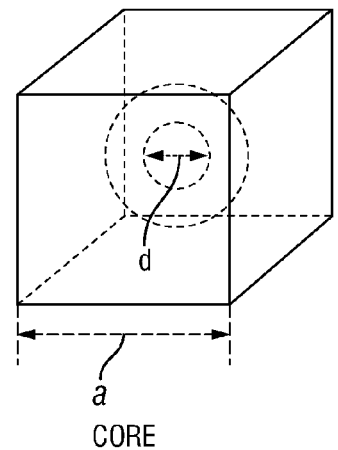

Consider 3D periodic foundations with a hard core coated by soft rubber set into reinforced concrete in a periodic manner. FIGS. 31A-31B shows two typical unit cells. The coated core is set at the center of the cube matrix. The side length of the cubic unit is a. For the case with cube, the side length of the cube core is b. For the case with sphere, the diameter of the core is d. For both cases, the thickness of the coating layer is t. To search possible engineering application, the matrix, coating and the core are made of reinforced concrete, rubber, and steel, respectively. Material properties are listed in Table 5.

TABLE 5

Material Properties.

| Materials | Young Modulus E (Pa) | Poisson Ratio v (1) | Mass Density ρ (kg/m³) |
|---|---|---|---|
| Concrete | $4.00 \times 10^{10}$ | 0.2 | 2500 |
| Rubber | $1.37 \times 10^{5}$ | 0.463 | 1300 |
| Steel | $2.09 \times 10^{11}$ | 0.275 | 7890 |

For infinite periodic structure system, the unit cell is arranged infinitely in three dimensions. So, the structure is highly symmetrical. According to the theory of periodic structure, the periodicity of the structure makes it possible to obtain the frequency band gaps by studying one periodic unit.

Let $u_{i(i=1,2,3)}$ be displacement in each of the x, y and z directions, respectively. Under the assumption of continuous, isotropic, perfectly elastic and small deformation as well as without consideration of damping, the governing equation of motion is:

$$\rho(r)\frac{\partial^2 u}{\partial t^2} = \nabla\{[\lambda(r) + 2\mu(r)](\nabla \cdot u)\} - \nabla \times [\mu(r)\nabla \times u] \quad 3.1$$

where $u=\{u_x, u_y, u_z\}$ is the displacement vector and $r=\{x, y, z\}$ the coordinate, $\lambda$ and $\mu$ the Lamé's constants, $\rho$ the mass density.

For isotropic material, Lamé coefficients can be expressed in terms of the Young's modulus E and the Poisson's ratio v as:

$$\lambda = \frac{vE}{(1+v)(1-2v)}; \mu = \frac{E}{2(1+v)} \quad 3.2$$

According to the Bloch's theory, the solutions of Eq. (3.1) can be expressed as:

$$u(r,t)=e^{i(kx-\omega t)}u_K(r) \quad 3.3$$

where K denotes the wave vector in the reciprocal space; ω is the angular frequency. $u_K(r)$ is the wave amplitude, which is a periodic function:

$$u_K(r)=u_K(r+a) \quad 3.4$$

a is the periodic constant vector.

Substituting Eq. (3.4) into Eq. (3.3), periodic boundary conditions can be obtained:

$$u(r+a,t)=e^{K \cdot s}u(r,t) \quad 3.5$$

Given a special Bloch wave vector K, the eigen-frequencies of the system can be found by the modal analysis. To ensure the accuracy of the results, the mesh size is set according to shortest wave length in calculations.

Figure 32:
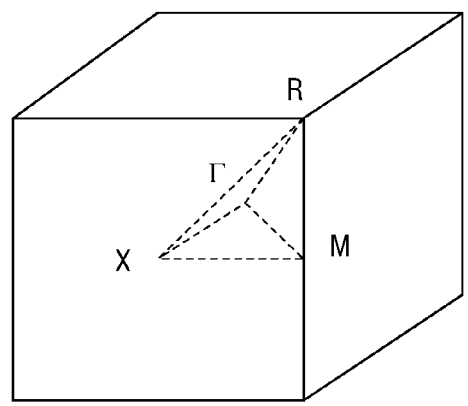
FIG. 32 shows first irreducible Brillouin zone of 3D periodic structures.

Owing to the high symmetry for the considered periodic structures, it is sufficiently accurate to calculate the eigen-frequencies for wave vector varying along the boundary of the first irreducible Brillouin zone (the pyramid R-M-F-X-M) as shown in FIG. 32. Relationship between eigen-frequency and the wave vector is the so called dispersion structure.

Dispersion Relationships

Figure 33:
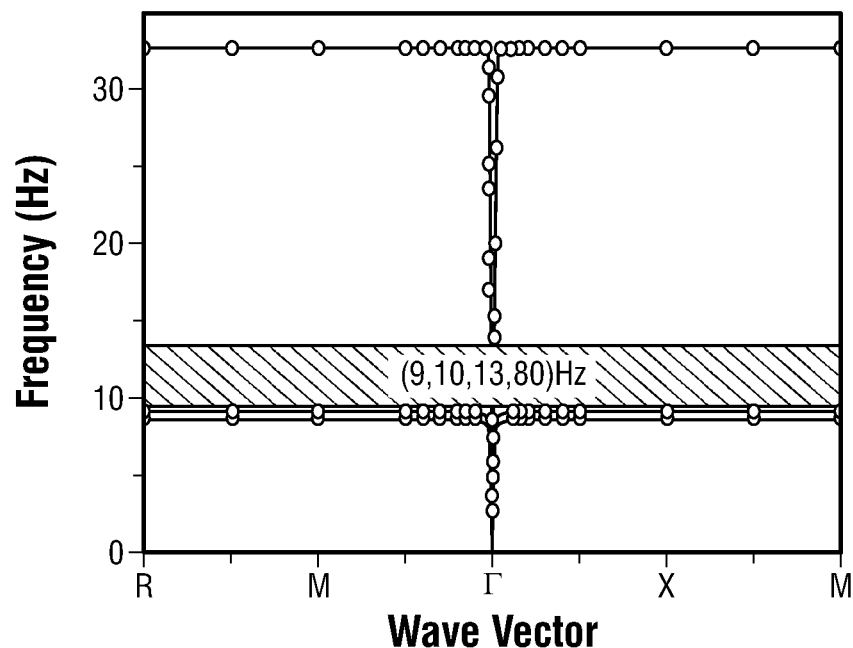
FIG. 33 shows the dispersion relationship of a coated cube inclusion periodic structure.

FIG. 33 shows the dispersion relationship of a coated square inclusion periodic structure with a=1 m, t=0.1 m and b=0.6 m. An absolute band gap is in the region between 9.10 Hz and 13.80 Hz, which means waves/vibrations in the region cannot propagate in the infinite periodic structure. Different from the dispersion relationship of the case without the coating, the dispersion relationship in this case is flat.

Figure 34:
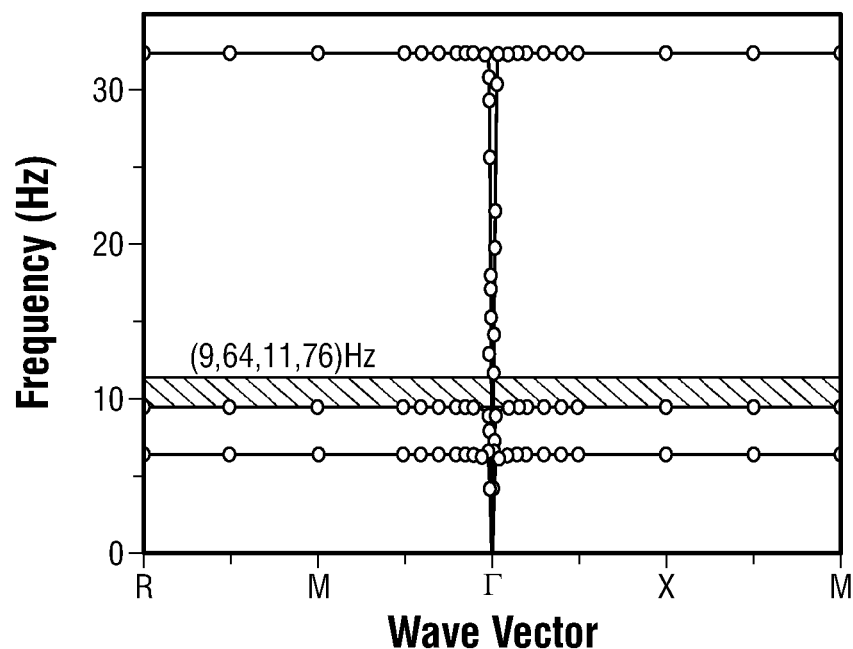
FIG. 34 shows the dispersion relationship of a coated sphere inclusion periodic structure

For the case with sphere core, similar result is given in FIG. 34. Comparatively, the thickness of the coating t=0.1 m and the diameter of the sphere is d=0.6 m. An absolute frequency band gap is also found between 9.64 Hz and 11.76 Hz.

Obviously, all of the frequency band gaps are below 20 Hz, which is extremely useful for structure isolation. Further, the frequency band gap for the case with sphere inclusion is smaller than that of the case with cube inclusion when the side length of the cube core is equal to the diameter of the sphere core. Therefore, in the following analysis, our attention will be focused on the case with coated cube core.

Parametric Study

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

To isolate the external vibration effectively, it is always hoped that the frequency band gaps of periodic structure can be wider and lower for seismic design. To obtain better design for application, parametric study is needed to investigate the influences of the geometrical and materials parameters on the frequency band gap. For simplicity, the lower and upper bound frequency of the band gap, and the width of the band gaps is replaced by LBF (lower bound frequency), UBF (upper bound frequency) and WBG (width of the band gap), respectively.

Geometrical Parameters

Figure 35:
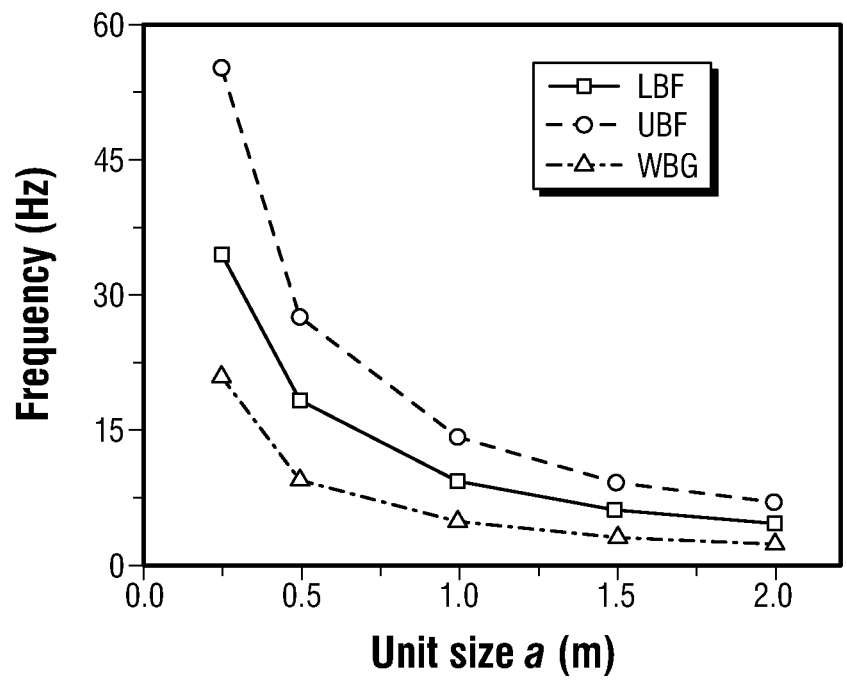
FIG. 35 shows the influences of the side length of the unit cell on the band gap.

First, FIG. 35 shows the influences of the side length of the unit cell on the band gap as taking the ratios of t/a and b/a constants. Obviously, with the increase of the side length the LBF and UBF are lowered dramatically. Because the UBF decreases faster than the LBF, the WBG become smaller. Besides, it is found that the band gaps will be <20 Hz for the side length in (1~2)m.

Figure 36:
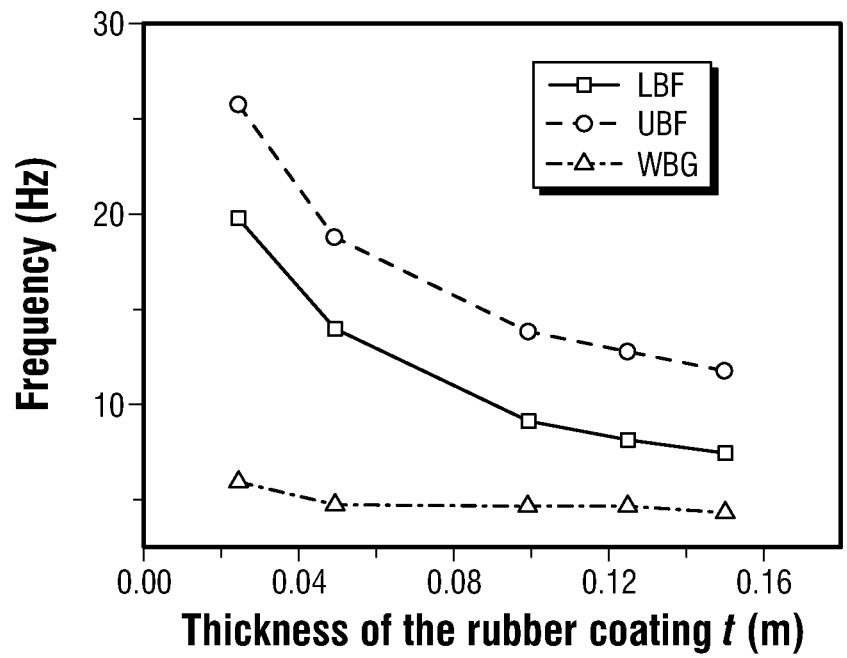
FIG. 36 shows the changes of the band gap with the thickness of the rubber coating.

Influences of the thickness of the rubber coating on the band gap are investigated as taking the side length of the core b=0.6 m and the side length of the unit cell a=1.0 m as const. FIG. 36 shows the changes of the first band gap with the thickness of the rubber coating (t). The LBF and UBF are lowered as the thickness of the rubber coating increases. In contrast to FIG. 35, the WBG changes small in this case.

Figure 37:
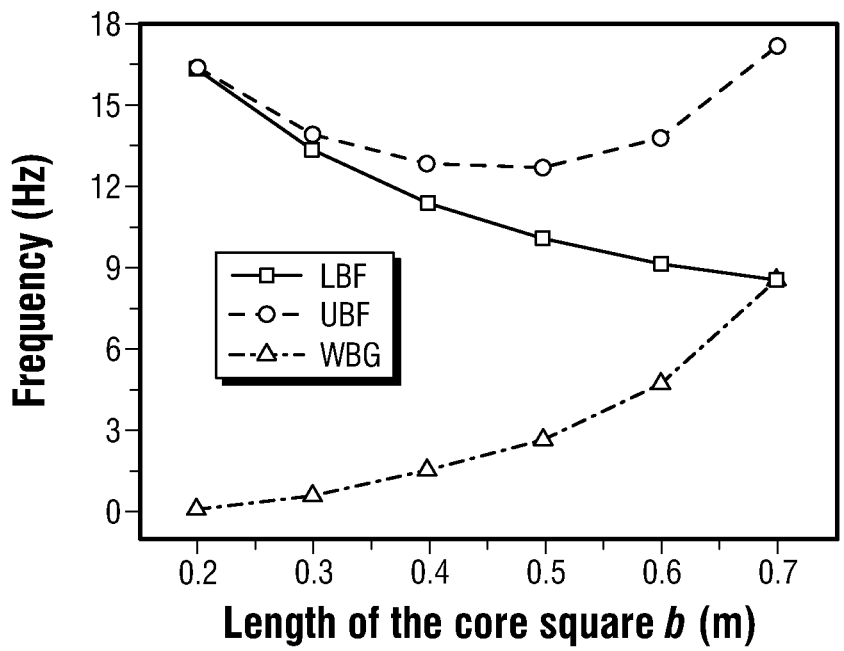
FIG. 37 shows the influence of the length of the core square (b) on the band gap.

The relationship between the frequency band gap and the side length of the core square is studied. In the case, the thickness of the rubber coating is t=0.1 m, the side length of the unit cell is a=1.0 m. As shown in FIG. 37, a small band gap is found for the case b=0.2 m. With the increase of the side length of the cube core, the LBF decreases. The UBF decreases for b<0.5 m and it increases for b>0.5 m. Further, it is found that the LBF lowers faster than the UBF for b<0.5 m. Therefore, one can see the WBG increases continuously. For b=0.7 m, the WBG is about 9 Hz (i.e. from 8.5 to 17.15 Hz).

Material Parameters

The three component periodic structure considered here is a type of local resonant phononic crystal. The frequency band gap of local resonant phononic crystal is governed by the local resonant oscillator. Therefore, materials parameters also play important role in frequency band gaps. Take the model with the side length of the cube matrix a=1.0 m, the side length of the square core b=0.6 m and the thickness of the coating t=0.1 m for an example. Two main parameters: the Young's modulus of the coating and the mass density of the core are considered here.

Figure 38:
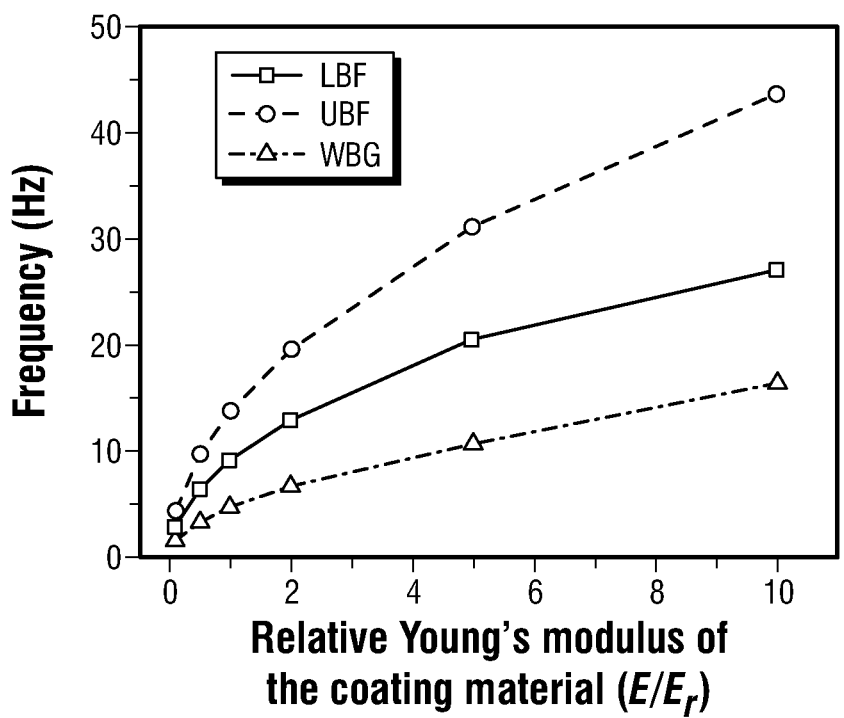
FIG. 38 shows the relationship between the relative Young's modulus and the band gap.

FIG. 38 presents the relationship between the relative Young's modulus of the coating material and the first band gap. The LBF and UBF go up with the increase of the relative Young's modulus. Also, the WBG goes up in the same manner. Therefore, it means that softer coating materials will give lower and narrower frequency band gap.

Figure 39:
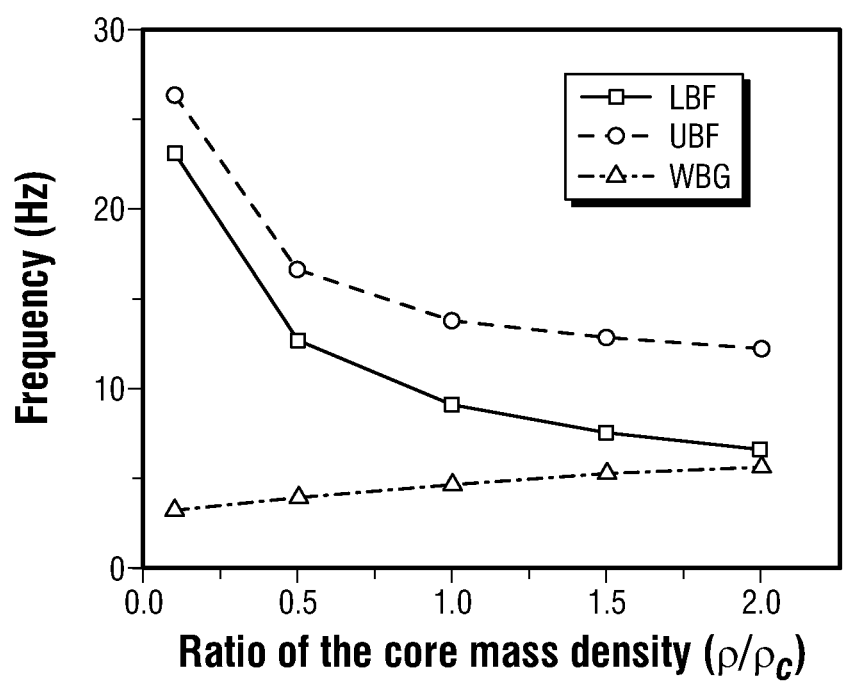
FIG. 39 shows the variation of the band gap as the mass density of the core varies.

FIG. 39 gives the variation of the frequency band gap as varying the mass density of the core materials. In a similar way, the ratio of the core mass density $\rho/\rho_c$ is considered as the variation. The LBF and UBF are lowered with the increase of the relative mass density parameter. Interestingly, the LBF decreases much faster than the UBF, and the WBG goes up along with the increment of the relative mass density. In other word, the heavier core material is beneficial to get lower and wider frequency band gap.

Finite Periodic Structures

All of the periodic structures used in actual design are finite periodic structures. Therefore, it is necessary to analyze the dynamic properties of finite periodic structure. Specially, for structural isolation application the dynamic responses of upper-structure are very important.

Figure 40A:
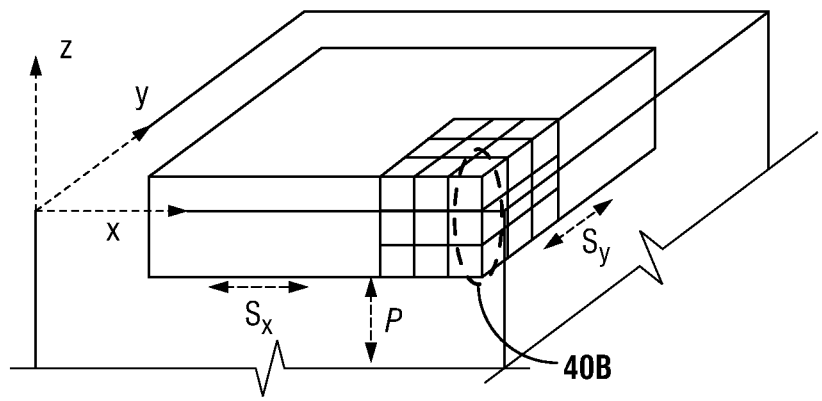
FIGS. 40A-40C are illustrative embodiments of a layout of a 3D periodic foundation system and simplified models.
Figure 40B:
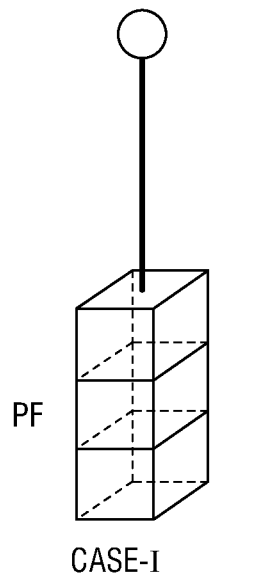
Figure 40C:
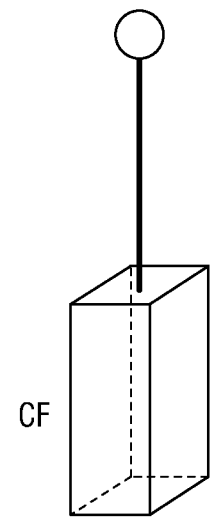

FIGS. 40A-40C shows the layout of a 3D periodic foundation system. Superior to 1D and 2D periodic foundation, 3D periodic foundation is a multi-dimensional isolation system. The absolute frequency band gaps can isolate all types of vibrations, the so-called P mode, $S_x$ mode and $S_y$ mode waves. In the present analysis, the complex 3D periodic foundation system is simulated by using a simple model, in which three unit cells are set in z direction. The upper structure is simplified as a lumped mass with a beam. The simplified upper structure set on the top surface of the periodic foundation is considered (i.e. PF). For comparison, the simplified upper structure with concrete foundation is also considered (i.e. CF).

The side length of the cube unit cell is 1 m, the side length of the cube core is 0.7 m, and the thickness of the rubber coating is 0.1 m. As given in the section above, the first frequency band gap for the infinite periodic structure composited by this unit cell, is in the region from 8.50 Hz to 17.15 Hz. For the upper-structure, the lumped masses are m=120 kg, and the radius of circle section for the concrete columns is 0.15 m.

Our simulations are conducted by using the commercial software ANSYS 10.0. The solid foundation is simulated by using the element SOLID-45. For the simplified upper-structure, the concentrated mass and the beam are simulated by using the element MASS-21 and element BEAM-189, respectively. Additionally, the interaction between the element Beams-189 (6 degrees of freedom) and the element Solide-45 (3 degrees of freedom) are simulated by three node coupling constraints and three constraint equations.

Frequency Response Function

To obtain the frequency response function in one direction, fixed displacement boundary conditions will be set on the bottom surface of foundations in the other two directions. And a displacement input in the direction with unit amplitude and different frequency is added on every node in the bottom surface of foundations. The frequency of the input varies in (8.5~18) Hz, with an interval Δf=0.5 Hz. The steady-state responses for every node are obtained.

In our numerical simulation, frequency response functions, in z direction (vertical direction) and in y direction (horizontal directions), are considered. As the model is symmetrical in x and y directions, results in the x direction are the same as those in the y direction.

The frequency response function is defined as:

$$FRF=20\lg(x_{rep}/x_{imp}) \qquad 3.6$$

Where $x_{rep}$ is the response and $x_{imp}$ the input.

Figure 41:
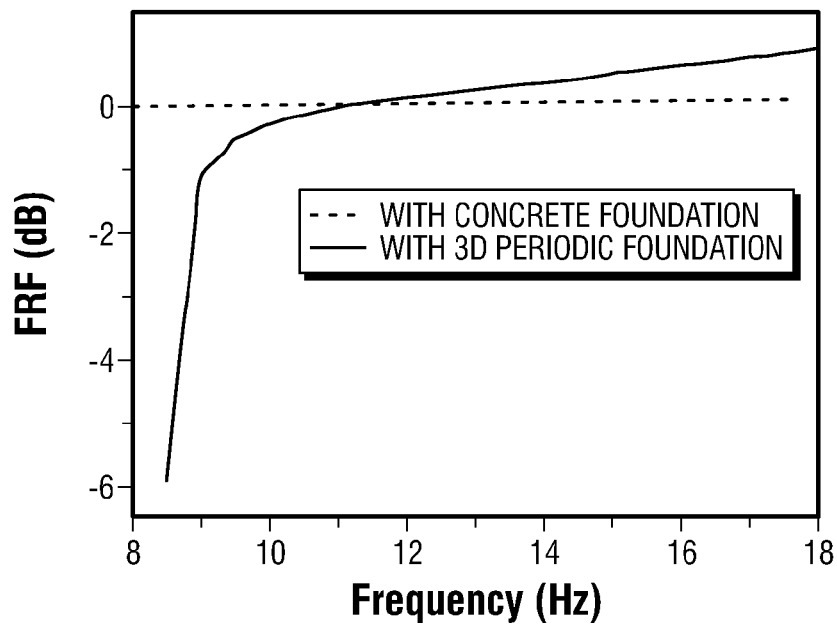
FIG. 41 shows the displacement FRF of a node in a vertical direction.
Figure 42:
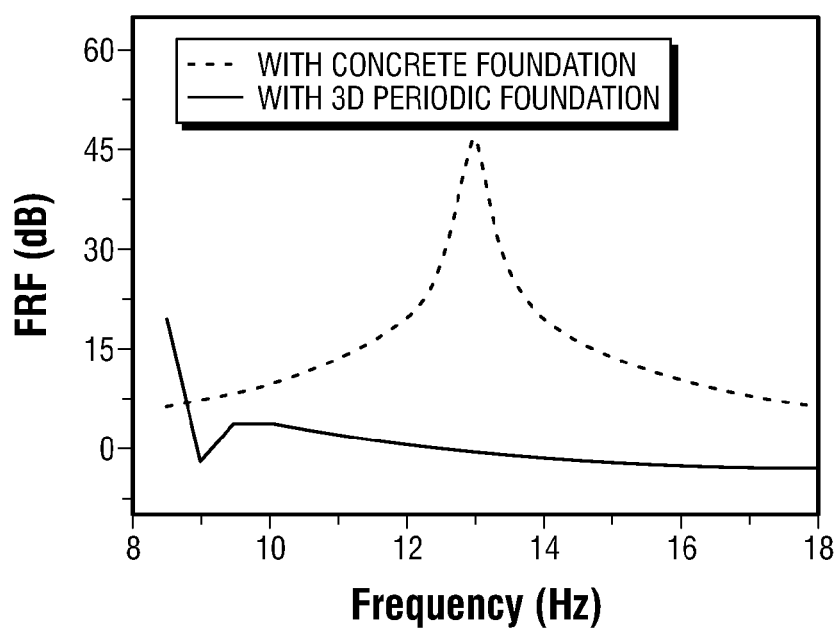
FIG. 42 shows the displacement FRF of a node in a horizontal direction.

FIG. 41 presents the displacement FRF of the top node with the model under the displacement input in z direction, the so-called P mode wave input. Obviously, for the case with periodic foundation responses are lower than that of the case with concrete foundation at the beginning of the band gap. However, as f>11.5 Hz responses of the top node with PF are larger. The result is lined with the so-called FANO-like phenomenon. Similarly, the displacement FRF for the point of the lumped mass with the displacement input in y direction, the so-called $S_y$ mode wave inputs are shown in FIG. 42. For the case with periodic foundation responses for the lumped mass is smaller than that with concrete foundation. The FANO-like feature is not obvious in this case.

Seismic Isolation Analysis

In this part, the efficiency of the periodic foundation to isolate seismic waves under multi-dimensional directions is analyzed. Damping effect is neglected in our analysis. By using the Big-Mass-Method, the acceleration records are applied in z and y directions on all nodes at the bottom surface. According to the symmetrical property of the model, vibration properties in z (vertical) direction and y (horizontal) direction are considered only. The 1984 Bishop (Rnd Val) seismic acceleration records MCG-UP and MCG360 are used for every node at the bottom surface of foundation in z and y directions, respectively. The main frequencies of the seismic records MCG-UP and MCG360 are modified to 8.9 Hz and 9.0 Hz, respectively. The seismic records are obtained from the PEER Ground Database.

Figure 43:
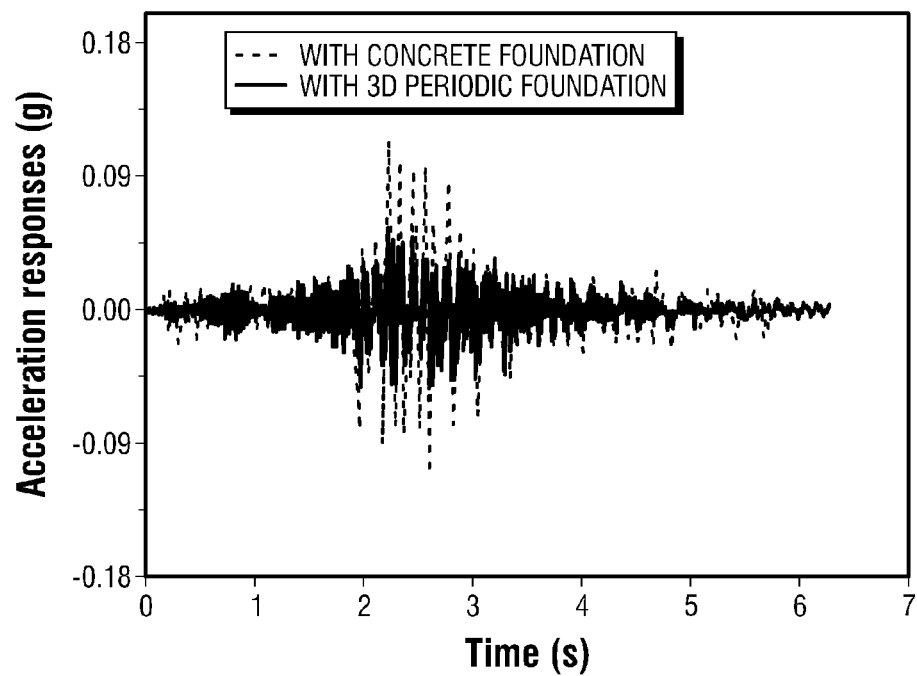
FIGS. 43 and 44 show the acceleration responses of a node in z (vertical) and in y (horizontal) directions, respectively.
Figure 44:
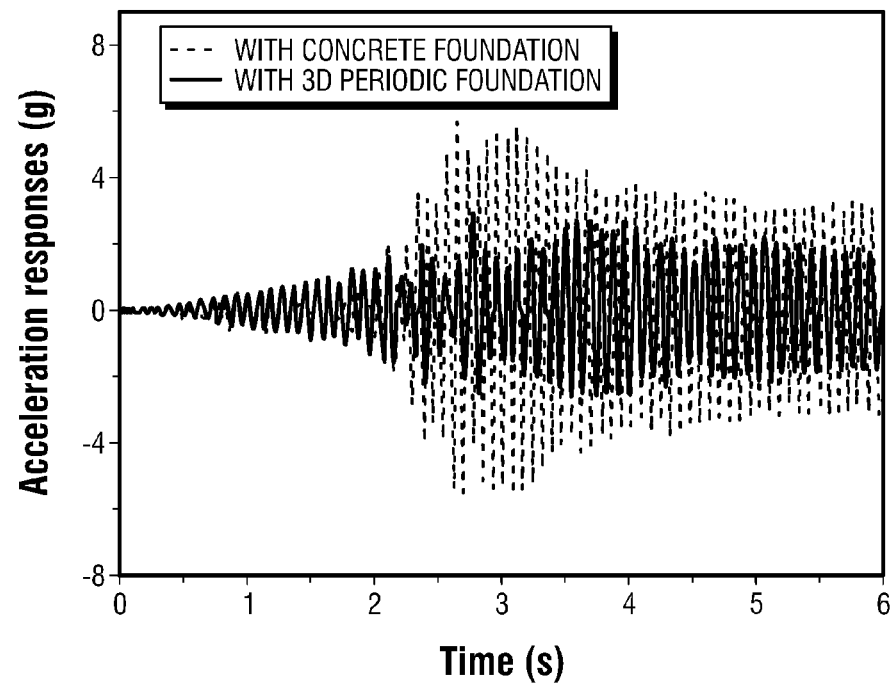

FIGS. 43 and 44 show the acceleration responses of the lumped mass node in z (vertical) and in y (horizontal) directions, respectively. Obviously, for the case with PF acceleration response of the lumped mass node is smaller than that of the case with CF. The results indicate that the 3D periodic foundation can isolate the seismic waves in all three directions.

CONCLUSIONS

This work studied the feasibility of a 3D periodic foundation-based structural vibration isolation system. From the elasto-dynamic theory, the absolute frequency band gap for infinite periodic structure is found. Using numerical simulations the efficiency of seismic isolation for the periodic structure is investigated. At least the following conclusions can be made:

1) By using construction materials, concrete, rubber and steel, two types of 3D periodic structures are studied. For both cases, the frequency band gaps are found in low-frequency regions. Comparatively speaking, for the case with coated cube core, the frequency band gap is wider and lower than for the case with coated sphere core, as taking the side length of the core and the diameter of the sphere core with the same value.

2) Geometrical parameters and materials parameters of the unit cell play important role in the frequency band gap. The frequency band gap will be lowered with the increase of the side length of the unit cell and the thickness of the rubber coating. With the increasing the side length of the cube core, the band gap will be lower and wider. The softer coating material will give the lower and narrower band gap; the heavier core material will provide the lower and wider band gap.

3) Numerical simulations show the large vibration attenuation can be found in the band gap as vibration traveling through three units. The seismic isolation analysis shows that the proposed 3D periodic foundation has potential application in multi-dimensional structural vibration isolation.

Implementations described herein are included to demonstrate particular aspects of the present disclosure. It should be appreciated by those of skill in the art that the implementations described herein merely represent exemplary implementation of the disclosure. Those of ordinary skill in the art should, in light of the present disclosure, appreciate that many changes can be made in the specific implementations described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The implementations described hereinabove are meant to be illustrative only and should not be taken as limiting of the scope of the disclosure.

What is claimed is:

1. A seismic isolation system comprising:
   a periodic foundation for a structure that produces gaps in the frequency response of a structure, wherein the periodic foundation comprises at least one array of periodic unit cells, each of the unit cells comprises
      a core formed from a strong material having a density of 7000 kg/m$^3$ or greater, wherein an entirety of the core is solid and non-hollow,
      a coating surrounding at least a portion of the core, wherein the coating is formed from an elastic material, and
      a matrix material surrounding the core and coating, wherein the core and coating are fully embedded in the matrix material.

2. The system of claim 1, wherein the coating is rubber or a material having Young's modulus less than that of rubber.

3. The system of claim 1, wherein the matrix material is concrete.

4. The system of claim 1, wherein all frequency band gaps of the periodic foundation are equal to or below 20 Hz.

5. The system of claim 1, wherein the core is a cylinder, right circular cylinder, elliptic cylinder, parabolic cylinder, or hyperbolic cylinder, cube or cuboid.

6. The system of claim 1, wherein the core is entirely surrounded by the coating.

7. The system of claim 1, wherein the core is a sphere, cuboid, or cube.

8. The system of claim 1, wherein a side length of at least one of the array of unit cells is ≥1 m.

9. The system of claim 1, wherein a thickness of the coating is ≥0.04m.

10. The system of claim 1, wherein a length of the core is ≥0.4 m and ≤0.7 m.

11. The system of claim 1, wherein a ratio of core mass density is ≥0.5 and ≤2.0.

12. A method for seismic isolation comprising:
    coating at least a portion of each of a plurality of cores with a coating to form a plurality of coated cores, wherein the plurality of cores are a strong material having a density of 7000 kg/m$^3$, an entirety of each of the plurality of cores is solid and non-hollow, and the coating is an elastic material;
    dispersing the plurality of coated cores in a matrix material so that the plurality of coated cores are fully embedded in the matrix material to form a periodic foundation that produces gaps in the frequency response of a structure, wherein a structure is positioned on the periodic foundation.

13. The method of claim 12, wherein the coating is rubber or a material having Young's modulus less than that of rubber.

14. The method of claim 12, wherein the matrix material is concrete.

15. The method of claim 12, wherein all frequency band gaps of the periodic foundation are equal to or below 20 Hz.

16. The method of claim 12, wherein the core is a cylinder, right circular cylinder, elliptic cylinder, parabolic cylinder, or hyperbolic cylinder, cube or cuboid.

17. The method of claim 12, wherein the core is entirely surrounded by the coating.

18. The method of claim 12, wherein the core is a sphere, cuboid, or cube.

19. The method of claim 12, wherein a side length of a periodic cell of the periodic foundation comprising one of the plurality of coated cores and the matrix material surrounding the core is ≥1 m.

20. The method of claim 12, wherein a thickness of the coating is ≥0.04m.

21. The method of claim 12, wherein a length of the core is ≥0.4m and ≤0.7m.

22. The method of claim 12, wherein a ratio of core mass density is ≥0.5 and ≤2.0.

23. A seismic isolation system comprising:
a periodic foundation for a structure that produces gaps in the frequency response of a structure, wherein the periodic foundation comprises
two or more planar elastic layers and
two or more planar strong layers, wherein the two or more planar elastic layers comprises elastic material and the two or more planar strong layers comprises concrete, and the two or more planar elastic layers and strong layers are arranged in alternating layers.

24. The system of claim 23, wherein the at least one planar elastic layer is rubber.

25. The system of claim 23, wherein the produced gaps in the frequency response of periodic foundation isolates or mitigates frequencies equal to or less than 20 Hz.

26. The system of claim 23, wherein all of the produced gaps in the frequency response of periodic foundation are equal to or less than 20 Hz.

* * * * *